United States Patent
Kim et al.

(10) Patent No.: US 12,009,925 B2
(45) Date of Patent: Jun. 11, 2024

(54) METHOD FOR TRANSMITTING AND RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Seonwook Kim, Seoul (KR); Suckchel Yang, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 17/421,976

(22) PCT Filed: Jan. 10, 2020

(86) PCT No.: PCT/KR2020/000484
§ 371 (c)(1),
(2) Date: Jul. 9, 2021

(87) PCT Pub. No.: WO2020/145732
PCT Pub. Date: Jul. 16, 2020

(65) Prior Publication Data
US 2022/0116150 A1 Apr. 14, 2022

(30) Foreign Application Priority Data

Jan. 11, 2019 (KR) .................. 10-2019-0004037
Nov. 6, 2019 (KR) .................. 10-2019-0141190

(51) Int. Cl.
*H04L 1/1812* (2023.01)

(52) U.S. Cl.
CPC ................... *H04L 1/1812* (2013.01)

(58) Field of Classification Search
CPC ... H04L 1/1812; H04L 1/1854; H04L 1/1896; H04L 1/1822; H04W 74/0808
See application file for complete search history.

(56) References Cited

U.S. PATENT DOCUMENTS

2019/0246412 A1* 8/2019 Noh .................. H04W 72/1268
2020/0015264 A1* 1/2020 Noh .................. H04W 74/004
(Continued)

FOREIGN PATENT DOCUMENTS

| KR | 20140052837 | 5/2014 |
| KR | 20180011106 | 1/2018 |
| KR | 20180042263 | 4/2018 |

OTHER PUBLICATIONS

PCT International Application No. PCT/KR2020/000484, International Search Report dated May 6, 2020, 16 pages.
(Continued)

*Primary Examiner* — Abdullahi Ahmed
(74) *Attorney, Agent, or Firm* — LEE, HONG, DEGERMAN, KANG & WAIMEY

(57) ABSTRACT

In the present disclosure, in a wireless communication system: a base station transmits, to a terminal, a downlink signal in a first cell; the terminal receives the signal and executes a channel access procedure (CAP); on the basis of the CAP, the terminal transmits, to the base station, a hybrid automatic repeat and request acknowledgement (HARQ-ACK) in a second cell included in an unlicensed band; the base station receives the signal; and the terminal and the base station are able to adjust a CWS.

15 Claims, 32 Drawing Sheets

(56) References Cited

U.S. PATENT DOCUMENTS

| | | | |
|---|---|---|---|
| 2022/0070923 A1* | 3/2022 | Li | H04W 74/0808 |
| 2022/0232625 A1* | 7/2022 | Liu | H04L 47/27 |
| 2022/0272673 A1* | 8/2022 | Yang | H04L 1/1861 |
| 2023/0171773 A1* | 6/2023 | Yang | H04W 72/1273 370/329 |
| 2023/0224957 A1* | 7/2023 | Myung | H04W 74/0808 370/329 |

OTHER PUBLICATIONS

ETRI, "Discussion on CW adjustment based on HARQ-ACK Feedback," R1-155832, 3GPP TSG RAN WG1 Meeting #82bis, Oct. 2015, 5 pages.

Ericsson et al., "WF on CW adjustment based on HARQ-ACK feedback," R1-154959, 3GPP TSG RAN WG1 #82, Aug. 2015, 5 pages.

* cited by examiner (a) Carrier aggregation between L-band and U-band (b) Standalone U-band(s)

METHOD FOR TRANSMITTING AND RECEIVING SIGNAL IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2020/000484, filed on Jan. 10, 2020, which claims the benefit of earlier filing date and right of priority to Korean Application No. 10-2019-0004037, filed on Jan. 11, 2019, and 10-2019-0141190, filed on Nov. 6, 2019, the contents of which are all hereby incorporated by reference herein in their entireties.

TECHNICAL FIELD

Embodiments of the present disclosure relate to a wireless communication system, and more particularly, to a method and apparatus for transmitting and receiving a signal in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

Various embodiments of the present disclosure may provide a method and apparatus for transmitting and receiving a signal in a wireless communication system.

Particularly, various embodiments of the present disclosure may provide a method and apparatus for adjusting a contention window size (CWS) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method and apparatus for transmitting and receiving a signal in a wireless communication system.

According to various embodiments of the present disclosure, a method of operating a user equipment (UE) in a wireless communication system may be provided.

According to an exemplary embodiment, the method may include receiving a downlink signal in a first cell from a base station (BS), performing a channel access procedure (CAP), transmitting a hybrid automatic repeat and request acknowledgment (HARQ-ACK) to the BS in a second cell configured in an unlicensed band based on the CAP, and adjusting a contention window size (CWS).

According to an exemplary embodiment, the CWS may be adjusted based on (i) the downlink signal, (ii) whether the first cell and the second cell are identical, and (iii) a determination as to whether the BS has successfully received the HARQ-ACK.

According to an exemplary embodiment, based on the downlink signal including downlink control information (DCI) and the first cell and the second cell being identical, the CWS may be maintained for both of a determination that the BS has successfully received the HARQ-ACK and a determination that the BS has not successfully received the HARQ-ACK.

According to an exemplary embodiment, the determination that the BS has successfully received the HARQ-ACK and the determination that the BS has not successfully received the HARQ-ACK may be related to successful reception of the DCI and failed reception of the DCI, respectively.

According to an exemplary embodiment, based on the downlink signal including DCI, the first cell and the second cell being different, and a determination that the BS has successfully received the HARQ-ACK, the CWS may be reset.

According to an exemplary embodiment, based on the downlink signal including DCI, the first cell and the second cell being different, and a determination that the BS has not successfully received the HARQ-ACK, the CWS may be increased.

According to an exemplary embodiment, the HARQ-ACK may be transmitted on a physical uplink control channel (PUCCH) in the second cell or on a physical uplink shared channel (PUSCH) in the second cell, According to an exemplary embodiment, the DCI may include information about a downlink assignment in correspondence with the transmission of the HARQ-ACK on the PUCCH.

According to an exemplary embodiment, the DCI may include information about an uplink grant scheduling the PUSCH in correspondence with the transmission of the HARQ-ACK on the PUSCH.

According to an exemplary embodiment, based on the downlink signal including a physical downlink shared channel (PDSCH), the first cell and the second cell being identical, and a determination that the BS has not successfully received the HARQ-ACK, the CAP may be maintained in response to processing of the HARQ-ACK as negative ACK (NACK), and the CAP may be increased in response to processing of the HARQ-ACK as IGNORE.

According to an exemplary embodiment, based on the downlink signal including a PDSCH, the first cell and the second cell being different, and a determination that the BS has successfully received the HARQ-ACK, the CWS may be reset, According to an exemplary embodiment, based on the downlink signal including the PDSCH, the first cell and the second cell being different, and a determination that the BS has not successfully received the HARQ-ACK, the CWS may be increased.

According to an exemplary embodiment, the CWS may be adjusted for every priority class.

According to an exemplary embodiment, based on at least one of preset first conditions being satisfied, it may be determined that the BS has successfully received the HARQ-ACK, and based on at least one of preset second conditions being satisfied, it may be determined that the BS has not successfully received the HARQ-ACK.

According to an exemplary embodiment, the preset first conditions may include a condition including (i) reception of a first request requesting an HARQ-ACK corresponding to a first index among a plurality of preset indexes from the BS, (ii) transmission of the HARQ-ACK corresponding to the first index to the BS, and (iii) the HARQ-ACK corresponding to the first index not being requested by a second request for an HARQ-ACK, received from the BS within a predetermined time period after the transmission of the HARQ-ACK corresponding to the first index According to an exemplary embodiment, the preset second conditions may include a condition including (i) reception of the first request from the BS, (ii) transmission of the HARQ-ACK corresponding to the first index to the BS, and (iii) the HARQ-ACK corresponding to the first index being requested by the second request for an HARQ-ACK, received from the BS within the predetermined time period after the transmission of the HARQ-ACK corresponding to the first index.

According to an exemplary embodiment, the predetermined time period may span slots between slot #n and slot #n+k, slot #n may be a slot in which the HARQ-ACK corresponding to the first index is transmitted, slot #n+k may be a slot in which a third request requesting an HARQ-ACK corresponding to a second index different from the first index among the plurality of preset indexes is received, n may be an integer equal to or greater than 0, and k may be a natural number.

According to an exemplary embodiment, the preset first conditions may include a condition including (i) reception of a fourth request requesting an HARQ-ACK corresponding to a first group among a plurality of preset groups from the BS, (ii) transmission of the HARQ-ACK corresponding to the first group to the BS, and (iii) a DCI field corresponding to the first group being toggled in DCI received from the BS after the transmission of the HARQ-ACK corresponding to the first group.

According to an exemplary embodiment, the preset second conditions may include a condition including (i) reception of the fourth request from the BS, (ii) transmission of the HARQ-ACK corresponding to the first group to the BS, and (iii) the DCI field corresponding to the first group not being toggled in the DCI received from the BS after the transmission of the HARQ-ACK corresponding to the first group.

According to various embodiments of the present disclosure, An apparatus operating in a wireless communication system may be provided.

According to an exemplary embodiment, the apparatus may include a memory and at least one processor connected to the memory.

According to an exemplary embodiment, the at least one processor may be configured to receive a downlink signal in a first cell from a BS, perform a CAP, transmit an HARQ-ACK to the BS in a second cell configured in an unlicensed band based on the CAP, and adjust a CWS.

According to an exemplary embodiment, the CWS may be adjusted based on (i) the downlink signal, (ii) whether the first cell and the second cell are identical, and (iii) a determination as to whether the BS has successfully received the HARQ-ACK.

According to an exemplary embodiment, the apparatus may communicate with at least one of a UE, a network, or an autonomous driving vehicle other than a vehicle including the apparatus.

According to various embodiments of the present disclosure, an apparatus operating in a wireless communication system may be provided.

According to an exemplary embodiment, the apparatus may include a memory and at least one processor connected to the memory.

According to an exemplary embodiment, the at least one processor may be configured to transmit a downlink signal in a first cell to a UE, receive an HARQ-ACK from the UE in a second cell configured in an unlicensed band based on the CAP, and adjust a CWS for a CAP.

According to an exemplary embodiment, the CWS may be adjusted based on (i) the downlink signal, (ii) whether the first cell and the second cell are identical, and (iii) a determination as to whether the HARQ-ACK has been successfully received.

According to various embodiments of the present disclosure, an apparatus operating in a wireless communication system may be provided.

According to an exemplary embodiment, the apparatus may include a processor and at least one memory storing at least one instruction which causes the processor to perform a method.

According to an exemplary embodiment, the method may include receiving a downlink signal in a first cell from a BS, performing a CAP, transmitting an HARQ-ACK to the BS in a second cell configured in an unlicensed band based on the CAP, and adjusting a CWS.

According to an exemplary embodiment, the CWS may be adjusted based on (i) the downlink signal, (ii) whether the first cell and the second cell are identical, and (iii) a determination as to whether the BS has successfully received the HARQ-ACK.

According to various embodiments of the present disclosure, a processor-readable medium storing at least one instruction which causes at least one processor to perform a method may be provided.

According to an exemplary embodiment, the method may include receiving a downlink signal in a first cell from a BS, performing a CAP, transmitting an HARQ-ACK to the BS in a second cell configured in an unlicensed band based on the CAP, and adjusting a CWS.

According to an exemplary embodiment, the CWS may be adjusted based on (i) the downlink signal, (ii) whether the first cell and the second cell are identical, and (iii) a determination as to whether the BS has successfully received the HARQ-ACK.

Various embodiments of the present disclosure as described above are only some of preferred embodiments of the present disclosure, and those skilled in the art may derive and understand many embodiments in which technical features of the various embodiments of the present disclosure are reflected based on the following detailed description.

Advantageous Effects

According to various embodiments of the present disclosure, the following effects may be achieved.

According to various embodiments of the present disclosure, a method and apparatus for adjusting a contention window size (CWS) in a wireless communication system may be provided.

Further, according to various embodiments of the present disclosure, a transmission success rate may be increased by adjusting a CWS based on success/failure of transmission/reception of a hybrid automatic repeat request-acknowledgment (HARQ-ACK) feedback.

Further, according to various embodiments of the present disclosure, a method of adjusting a CWS based on success/failure of transmission/reception of an HARQ-ACK feedback by a user equipment (UE) and/or a base station (BS) in various scenarios may be provided to enable efficient communication between the UE and the BS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
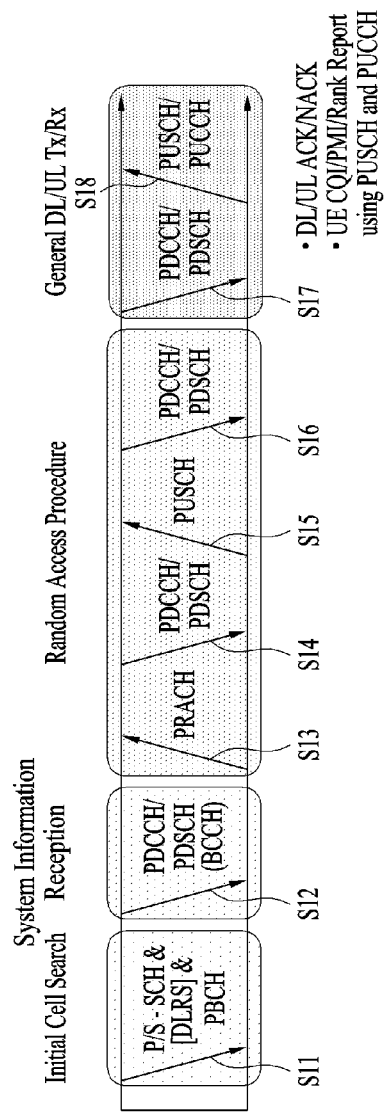
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The various embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the various embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the various embodiments of the present disclosure, in the various embodiments of the present disclosure may be explained by the above standard specifications. All terms used in the various embodiments of the present disclosure may be explained by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System

1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
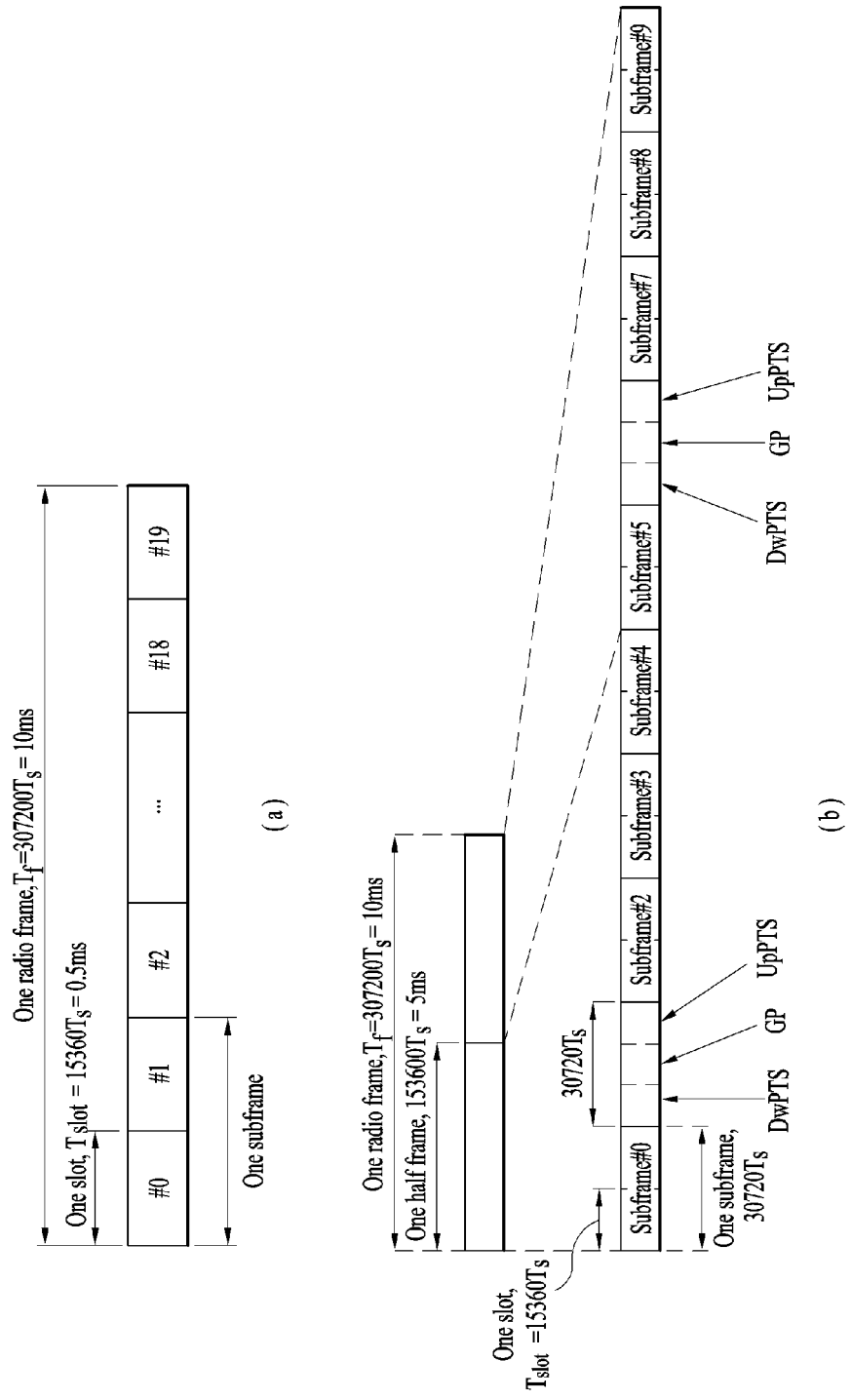
FIG. 2 is a diagram illustrating a radio frame structure in a long term evolution (LTE) system to which various embodiments of the present disclosure are applicable.
Figure 3:
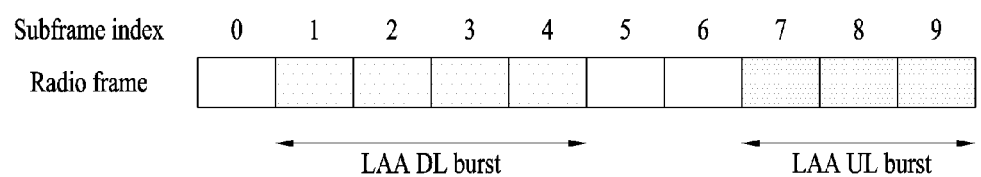
FIG. 3 is a diagram illustrating a radio frame structure in an LTE system to which various embodiments of the present disclosure are applicable.

FIGS. 2 and 3 illustrate radio frame structures in an LTE system to which various embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
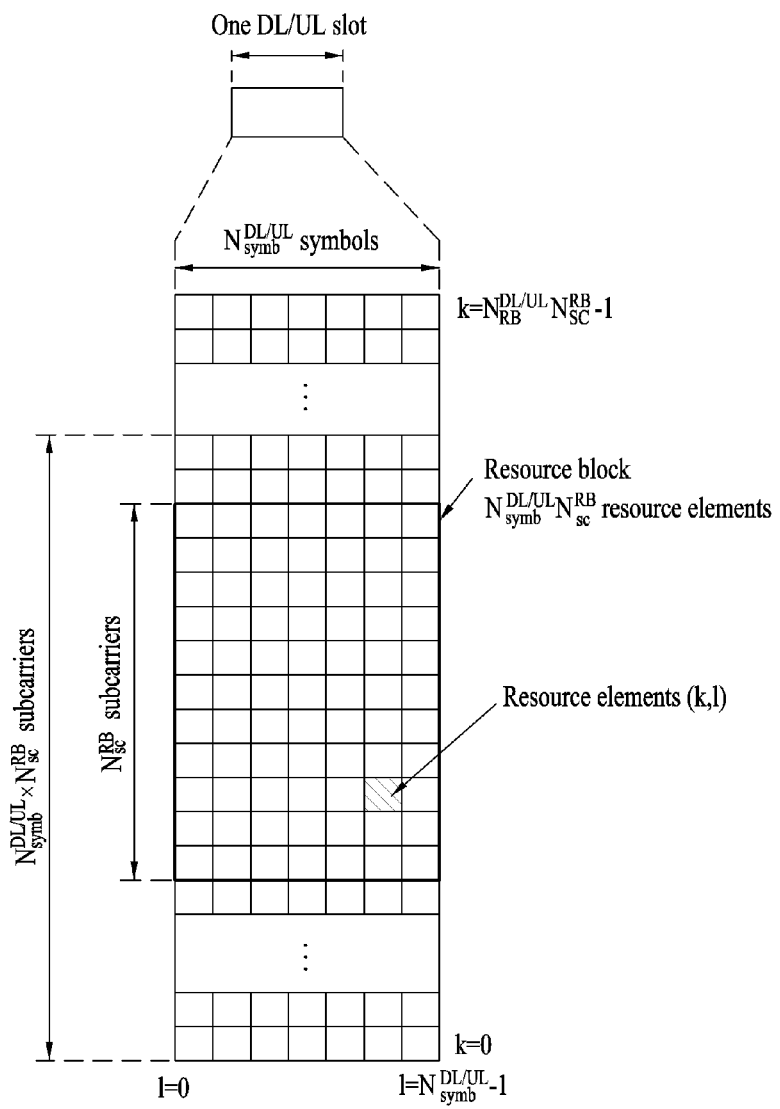
FIG. 4 is a diagram illustrating a slot structure in an LTE system to which various embodiments of the present disclosure are applicable.

FIG. 4 is a diagram illustrating a slot structure in an LTE system to which various embodiments of the present disclosure are applicable.

Referring to FIG. 4, a slot includes a plurality of orthogonal frequency division multiplexing (OFDM) symbols in the time domain by a plurality of resource blocks (RBs) in the frequency domain. A symbol may refer to a symbol duration. A slot structure may be described by a resource grid including $N^{DL/UL}_{RB}N^{RB}_{sc}$ subcarriers and $N^{DL/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to an SCS and a CP length (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot. k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 5:
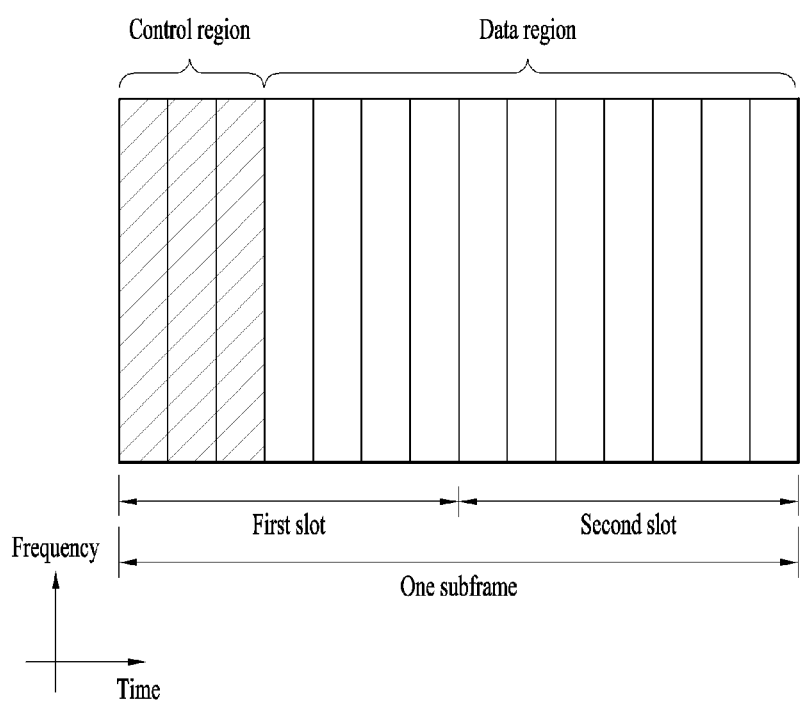
FIG. 5 is a diagram illustrating an uplink (UL) subframe structure in an LTE system to which various embodiments of the present disclosure are applicable.

FIG. 5 is a diagram illustrating a UL subframe structure in an LTE system to which various embodiments of the present disclosure are applicable.

Referring to FIG. 5, one subframe 500 includes two 0.5-ms slots 501. Each slot includes a plurality of symbols 502, each corresponding to one SC-FDMA symbol. An RB 503 is a resource allocation unit corresponding to 12 subcarriers in the frequency domain by one slot in the time domain.

A UL subframe is divided largely into a control region 504 and a data region 505. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 6:
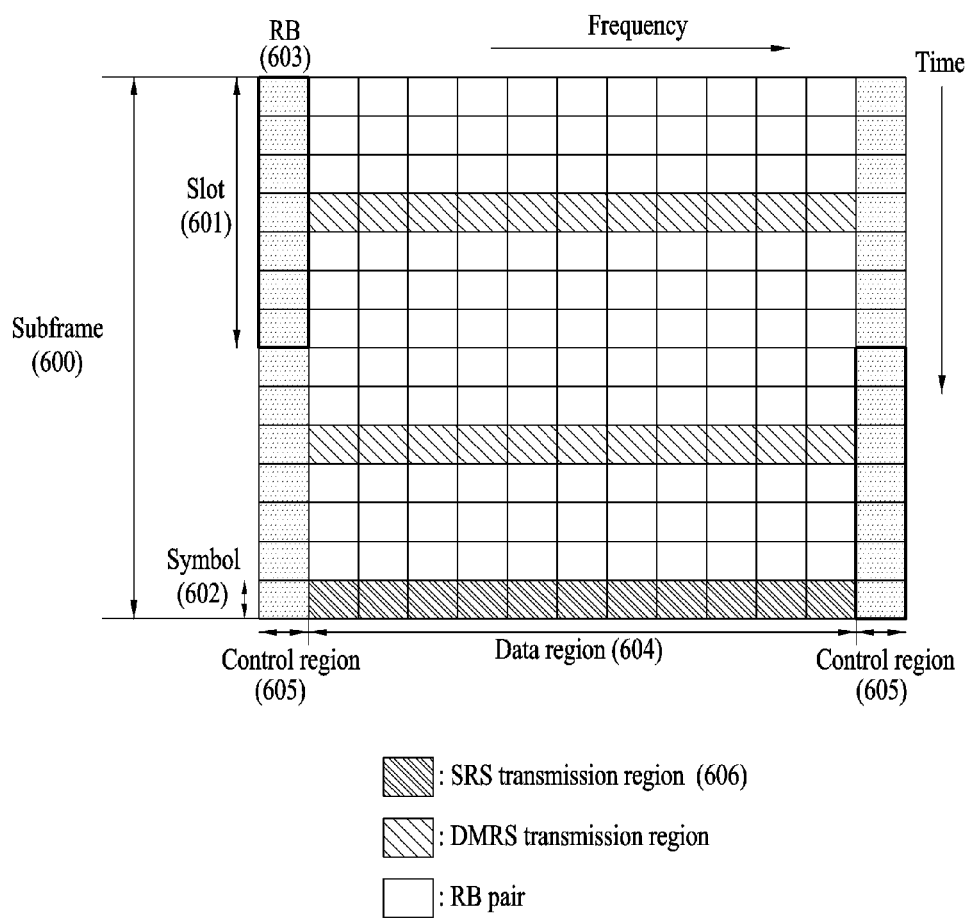
FIG. 6 is a diagram illustrating a downlink (DL) subframe structure in an LTE system to which various embodiments of the present disclosure are applicable.

FIG. 6 is a diagram illustrating a DL subframe structure in an LTE system to which various embodiments of the present disclosure are applicable.

Referring to FIG. 6, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, conveying information about the number of OFDM symbols (i.e., the size of a control region) used for transmission of control channels in the subframe. The PHICH is a response channel for a UL transmission, conveying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (Tx) power control command for any UE group.

Figure 7:
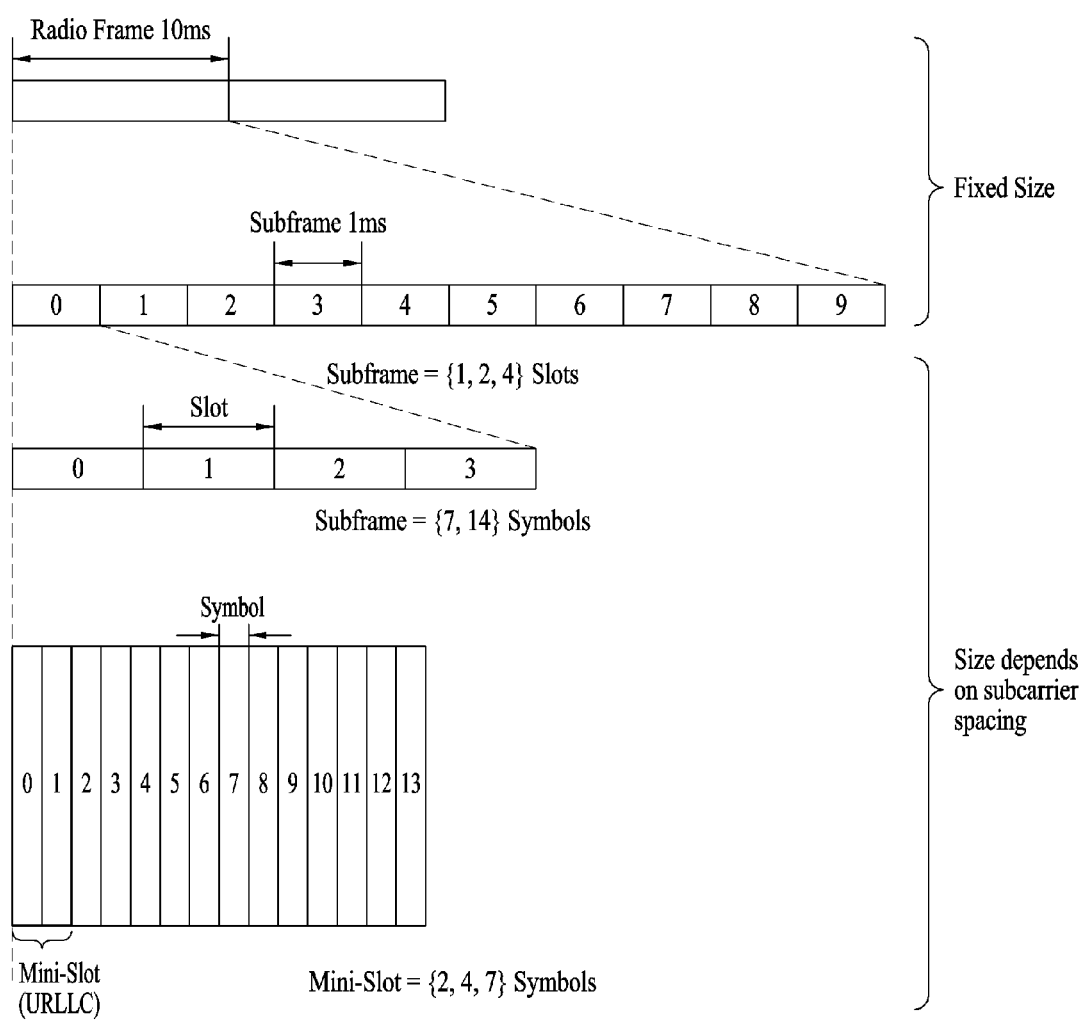
FIG. 7 is a diagram illustrating a radio frame structure in a new radio access technology (NR) system to which various embodiments of the present disclosure are applicable.

FIG. 7 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 4. For a bandwidth part, μ and a CP are obtained from RRC parameters provided by the BS.

TABLE 4

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 5 below defines the NR frequency band, by way of example.

TABLE 5

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as Ts=1/((15 kHz)*2048) are placed in the following relationship: $T_s/T_c = 64$. DL and UL transmissions are organized into (radio) frames each having a duration of $T_f = (\Delta f_{max} * N_f/100) * T_c = 10$ ms. Each radio frame includes 10 subframes each having a duration of $T_{sf} = (\Delta f_{max} * N_f/1000) * T_c = 1$ ms. There may exist one set of frames for UL and one set of frames for DL. For a numerology μ, slots are numbered with $n_s^\mu \in \{0, \ldots, N^{slot,\mu}_{subframe} - 1\}$ in an increasing order in a subframe, and with $n_{s,f}^\mu \in \{0, \ldots, N^{slot,\mu}_{frame} - 1\}$ in an increasing order in a radio frame. One slot includes $N^\mu_{symb}$ consecutive OFDM symbols, and $N^\mu_{symb}$ depends on a CP. The start of a slot $n_s^\mu$ in a subframe is aligned in time with the start of an OFDM symbol $n_s^\mu * N^\mu_{symb}$ in the same subframe.

Table 6 lists the number of symbols per slot, the number of slots per frame, and the number of slots per subframe, for each SCS in a normal CP case, and Table 7 lists the number of symbols per slot, the number of slots per frame, and the number of slots per subframe, for each SCS in an extended CP case.

TABLE 6

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 7

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 7 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Figure 8:
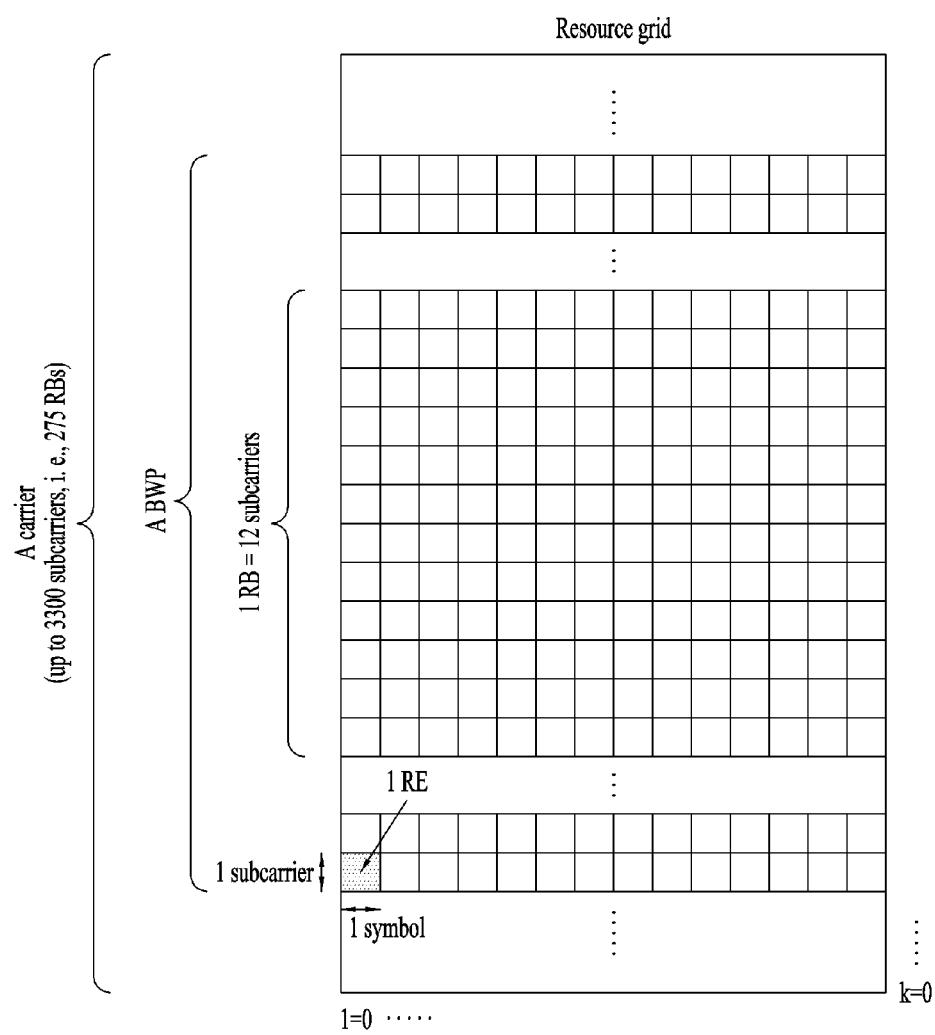
FIG. 8 is a diagram illustrating a slot structure in an NR system to which various embodiments of the present disclosure are applicable.

FIG. 8 is a diagram illustrating a slot structure in an NR system to which various embodiments of the present disclosure are applicable.

Referring FIG. 8, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
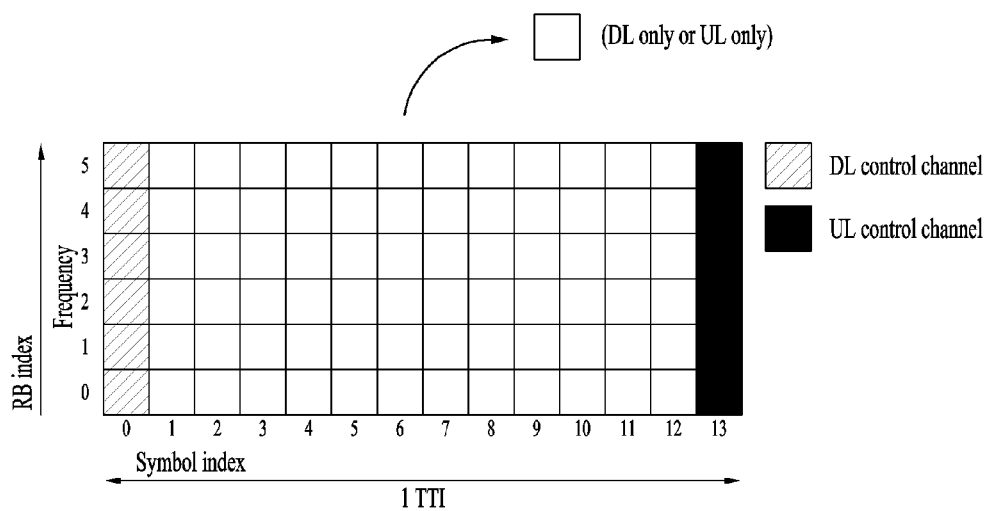
FIG. 9 is a diagram illustrating a self-contained slot structure to which various embodiments of the present disclosure are applicable.

FIG. 9 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
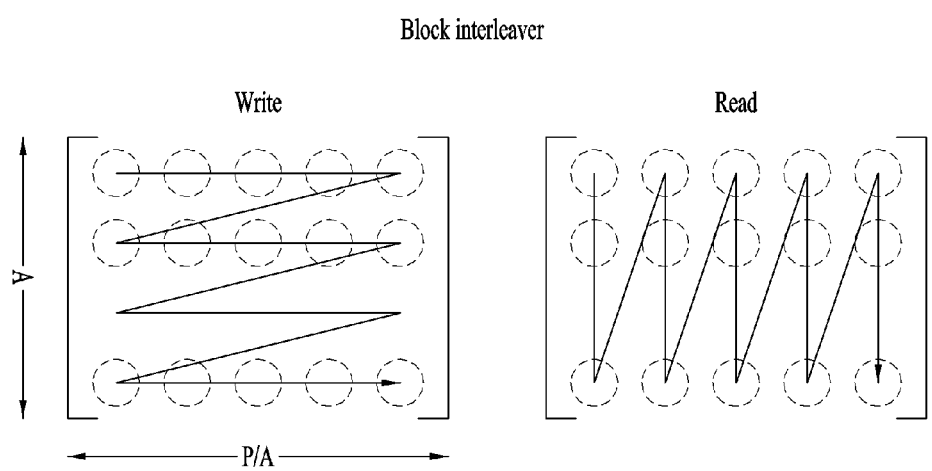
FIG. 12 is a diagram illustrating an exemplary block interleaver according to various embodiments of the present disclosure.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures

1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
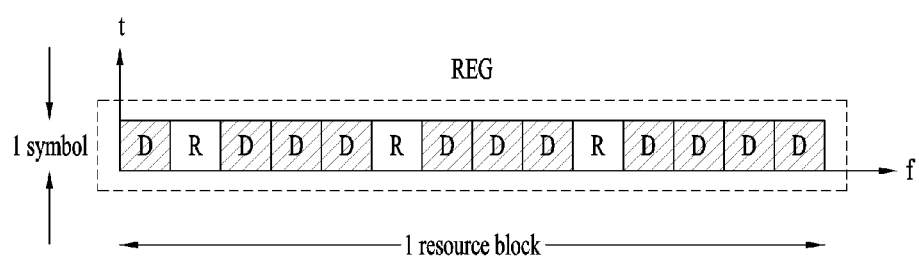
FIG. 10 is a diagram illustrating the structure of one resource element group (REG) in an NR system to which various embodiments of the present disclosure are applicable.

FIG. 10 is a diagram illustrating the structure of one REG to which various embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

Figure 11:
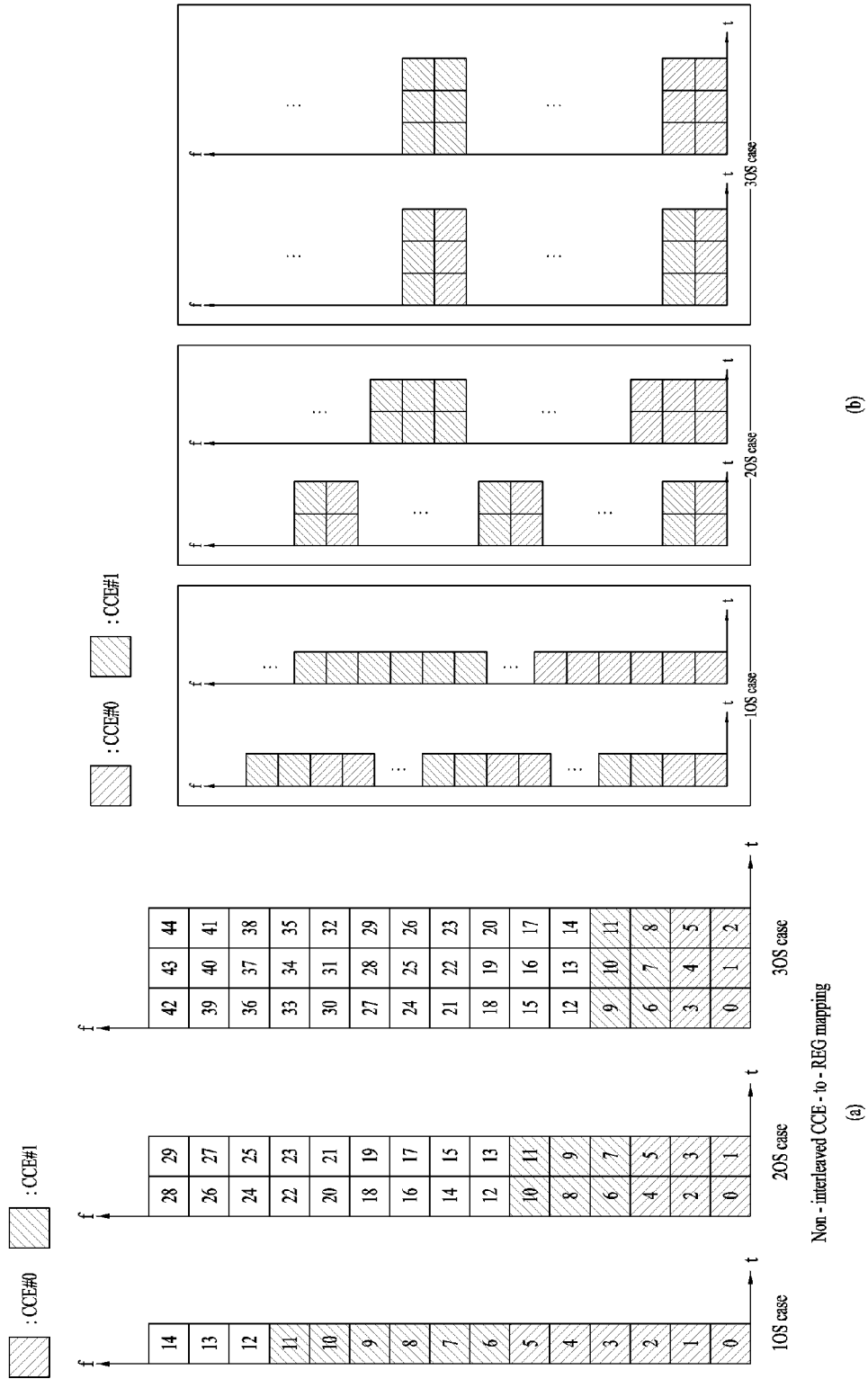
FIG. 11 is a diagram illustrating exemplary control channel element (CCE)-to-resource element group (REG) mapping types according to various embodiments of the present disclosure.

FIG. 11 is a diagram illustrating exemplary CCE-to-REG mapping types according to various embodiments of the present disclosure.

FIG. 11(a) is a diagram illustrating exemplary non-interleaved CCE-to-REG mapping according to various embodiments of the present disclosure.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

FIG. 11(b) is a diagram illustrating exemplary interleaved CCE-to-REG mapping.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

FIG. 12 illustrates an exemplary block interleaver according to various embodiments of the present disclosure.

For the above interleaving operation, the number A of rows in a (block) interleaver is set to one of 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. C4. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 8 lists exemplary features of the respective search space types.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTIm or MCS-C-RNTI, or CS-RNTI(s) | User specific PDSCH decoding |

Table 9 lists exemplary DCI formats transmitted on the PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 10 lists exemplary PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

2. Unlicensed Band/Shared Spectrum System

Figure 13:
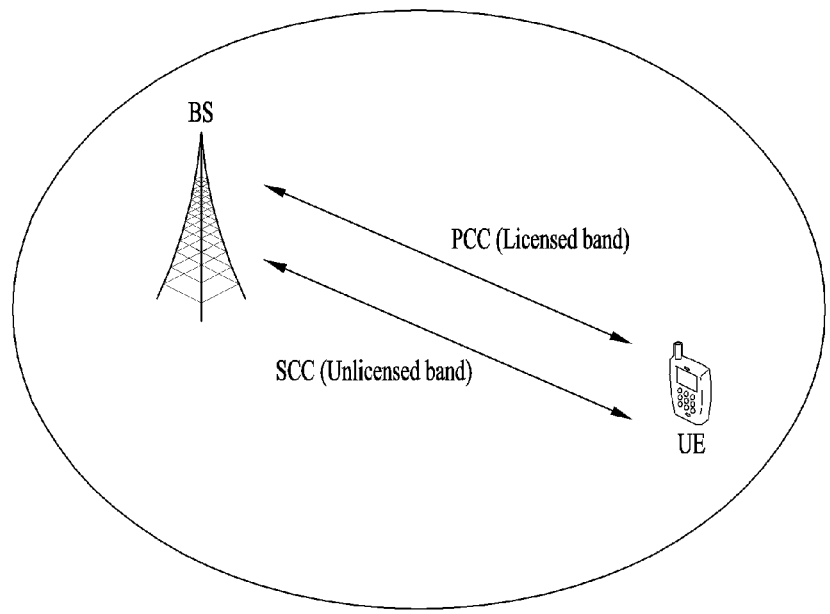
FIG. 13 is a diagram illustrating an exemplary wireless communication system supporting an unlicensed band to which various embodiments of the present disclosure are applicable.
Figure 13:
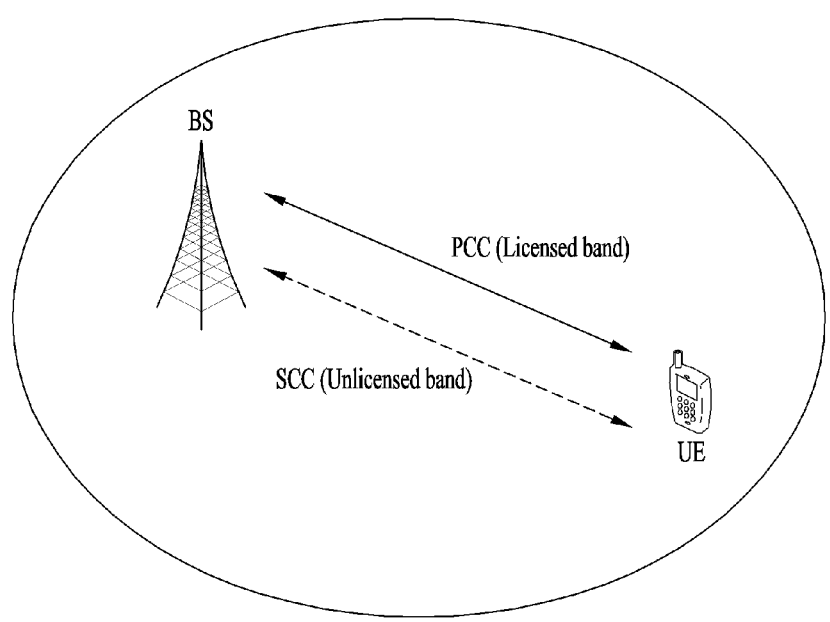

FIG. 13 is a diagram illustrating an exemplary wireless communication system supporting an unlicensed band to which various embodiments of the present disclosure are applicable.

In the following description, a cell operating in a licensed band (L-band) is defined as an L-cell, and a carrier of the L-cell is defined as a (DL/UL) LCC. Further, a cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is generically referred to as a cell.

When a UE and a BS transmit and receive signals to and from each other in a carrier-aggregated LCC and UCC, the LCC may be configured as a primary CC (PCC), and the UCC may be configured as a secondary CC (SCC), as illustrated in FIG. 13(a).

As illustrated in FIG. 13(b), the UE and the BS may transmit and receive signals to and from each other in one UCC or a plurality of carrier-aggregated LCCs and UCCs. That is, the UE and the BS may transmit and receive signals only in UCC(s) without an LCC. (Unless otherwise mentioned,) a signal transmission and reception operation in an unlicensed band as described in various embodiments of the present disclosure may be performed based on all of the above-described deployment scenarios.

2.1. Radio Frame Structure for Unlicensed Band

For an operation in an unlicensed band, frame structure type 3 of LTE (see FIG. 3) or an NR frame structure (see FIG. 7) may be used. The configuration of OFDM symbols occupied by a UL/DL signal transmission in a frame structure for the unlicensed band may be configured by the BS. Herein, the term OFDM symbol may be replaced with SC-FDM(A) symbol.

For a DL signal transmission in the unlicensed band, the BS may indicate the configuration of OFDM symbols used in subframe #n to the UE by signaling. In the following description, the term subframe may be replaced with slot or time unit (TU).

Specifically, in the wireless communication system supporting the unlicensed band, the UE may assume (or identify) the configuration of OFDM symbols occupied in subframe #n by a specific field (e.g., a Subframe configuration for LAA field or the like) in DCI received in subframe #n−1 or subframe #n from the BS.

Table 11 illustrates an exemplary method of representing the configuration of occupied OFDM symbols for transmission of a DL physical channel and/or physical signal in a current subframe and/or next subframe by the Subframe configuration for LAA field in the wireless communication system.

TABLE 11

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |

TABLE 11-continued

| Value of 'Subframe configuration for LAA' field in current subframe | Configuration of occupied OFDM symbols (current subframe, next subframe) |
|---|---|
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission duration to the UE by signaling.

Specifically, in an LTE system supporting an unlicensed band, the UE may acquire 'UL duration' and 'UL offset' information for subframe #n by a 'UL duration and offset' field in detected DCI.

Table 12 illustrates an exemplary method of representing a UL offset and UL duration configuration by the UL duration and offset field in the wireless communication system.

TABLE 12

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) UL offset l and UL duration d for subframe #n, the UE does not need to receive a DL physical channel and/or physical signal in subframe #n+l+i (i=0, 1, . . . , d−1).

2.2 Overview of Channel Access Procedures (CAPs)

Unless otherwise noted, the definitions below are applicable for the following terminologies used in the present disclosure.

A channel refers to a carrier or a part of a carrier composed of a contiguous set of RBs in which a CAP is performed in a shared spectrum.

A channel access procedure (CAP) may be a procedure based on sensing that evaluates the availability of a channel for performing transmissions. A basic unit for sensing is a sensing slot with a duration of $T_{sl}$=9 us. The sensing slot duration may be considered to be idle if an eNB/gNB or a UE senses the channel during the sensing slot duration, and determines that the detected power for at least 4 us within the sensing slot duration is less than an energy detection threshold $X_{Thresh}$. Otherwise, the sensing slot duration $T_{sl}$ may be considered to be busy.

Channel occupancy refers to transmission(s) on channel(s) by eNB/gNB/UE(s) after performing a corresponding CAP in this subclause.

A channel occupancy time (COT) refers to the total time for which eNB/gNB/UE(s) and any eNB/gNB/UE(s) sharing the channel occupancy perform transmission(s) on a channel after an eNB/gNB/UE performs the corresponding CAPs described in this subclause. For determining a COT, if a transmission gap is less than or equal to 25 us, the gap duration may be counted in the COT. The COT may be shared for transmission between an eNB/gNB and corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB may transmit transmission(s) after a gap within a DL transmission burst without sensing the corresponding channel(s) for availability.

A UL transmission burst is defined as a set of transmissions from a UE without any gap greater than 16 us. Transmissions from a UE separated by a gap of more than 16 us are considered as separate UL transmission bursts. A UE may transmit transmission(s) after a gap within a UL transmission burst without sensing the corresponding channel(s) for availability.

A discovery burst refers to a DL transmission burst including a set of signal(s) and/or channel(s) confined within a window and associated with a duty cycle. The discovery burst may be any of the following:

Transmission(s) initiated by an eNB that includes a primary synchronization signal (PSS), secondary synchronization signal (SSS) and cell-specific reference signal(s)(CRS) and may include non-zero power CSI-RS.

Transmission(s) initiated by a gNB that includes at least an SS/PBCH block and may also include a CORESET for a PDCCH scheduling a PDSCH with SIB1, and a PDSCH carrying SIB1 and/or non-zero power CS-RS. The SS/PBCH block may include a PSS, a SSS, and a PBCH with an associated demodulation reference signal (DM-RS).

2.3. Downlink Channel Access Procedures (DL CAPs)

For a DL signal transmission in an unlicensed band, the BS may perform a DL CAP for the unlicensed band as follows. On the assumption that a PCell being a licensed band and one or more SCells being an unlicensed band are basically configured for the BS, the following description is given of DL CAPs to which various embodiments of the present disclosure are applicable, in which an unlicensed band is referred to as a licensed assisted access (LAA) SCell. However, the DL CAPs may also be applied in the same manner, when only an unlicensed band is configured for the BS.

2.3.1. Type 1 DL Channel Access Procedures

This subclause describes CAPs to be performed by a BS for which a time duration spanned by sensing slots that are sensed to be idle before DL transmission(s) is random. This subclause is applicable to the following transmissions:
Transmission(s) initiated by a BS including a PDSCH/PDCCH/EPDCCH, or
Transmission(s) initiated by a BS including a unicast PDSCH with user plane data, or a unicast PDSCH with user plane data and a unicast PDCCH scheduling user plane data, or
Transmission(s) initiated by a BS with only a discovery burst or with a discovery burst multiplexed with non-unicast information, where the duration of the transmission(s) is larger than 1 ms or the transmission causes the discovery burst duty cycle to exceed 1/20.

The BS may perform a transmission after sensing the channel to be idle during the sensing slot durations of a defer duration $T_d$ and after a counter N is zero in step 4 described below. The counter N is adjusted by sensing the channel for an additional sensing slot duration according to the following procedure:
1) set N=$N_{init}$ where $N_{init}$ is a random number uniformly distributed between 0 and $CW_p$, and go to step 4;
2) if N>0 and the BS chooses to decrement the counter, set N=N-1;
3) sense the channel for an additional sensing slot duration, and if the additional sensing slot duration is idle, go to step 4; else, go to step 5;
4) if N=0, stop; else, go to step 2;
5) sense the channel until either a busy sensing slot is detected within an additional defer duration $T_d$ or all the sensing slots of the additional defer duration $T_d$ are detected to be idle; and
6) if the channel is sensed to be idle during all the sensing slot durations of the additional defer duration $T_d$, go to step 4; else, go to step 5.

Figure 14:
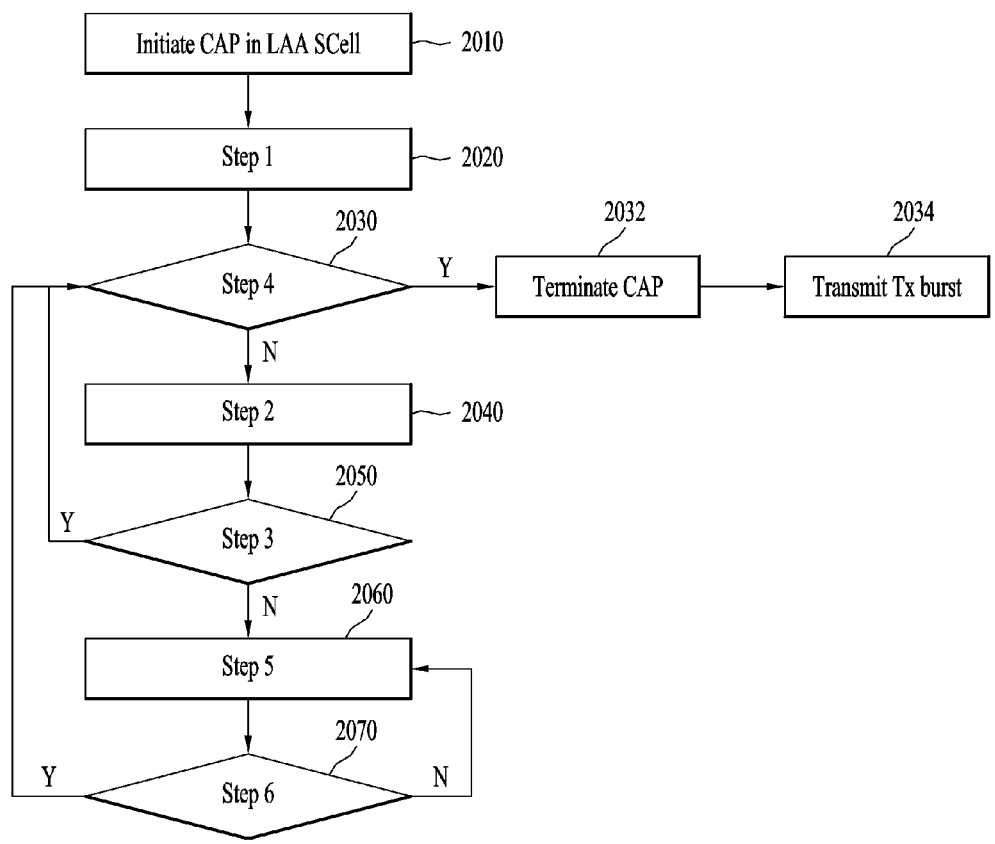
FIG. 14 is a flowchart illustrating a DL channel access procedure (CAP) for transmission in an unlicensed band, to which various embodiments of the present disclosure are applicable.

FIG. 14 is a flowchart illustrating a DL CAP for transmission in an unlicensed band, to which various embodiments of the present disclosure are applicable.

The afore-described Type 1 DL CAP may be summarized as follows.

For a DL transmission, a transmission node (e.g., a BS) may initiate a CAP (2010).

The BS may randomly select a backoff counter N within a contention window (CW) according to step 1. N is set to an initial value $N_{init}$ (2020). $N_{init}$ is a random value selected between 0 and $CW_p$.

Subsequently, when the backoff counter value N is 0 according to step 4 (2030; Y), the BS terminates the CAP (2032). The BS may then perform a Tx burst transmission (2034). On the contrary, when the backoff counter value N is not 0 (2030; N), the BS decrements the backoff counter value by 1 according to step 2 (2040).

Subsequently, the BS checks whether the channel is idle (2050). If the channel is idle (2050; Y), the BS determines whether the backoff counter value is 0 (2030).

On the contrary, when the channel is not idle, that is, the channel is busy in operation 2050 (2050; N), the BS determines whether the channel is idle during a longer defer duration $T_d$ (25 usec or longer) than a sensing slot duration (e.g., 9 usec) (2060). If the channel is idle during the defer duration (2070; Y), the BS may resume the CAP.

For example, when the backoff counter value $N_{init}$ is 10 and the channel is determined to be idle after the backoff counter value is decremented to 5, the BS senses the channel during the defer duration and determines whether the channel is idle. If the channel is idle during the defer duration, the BS may resume the CAP from the backoff counter value 5 (or from the backoff counter value 4 obtained by decrementing the backoff counter value 5 by 1), instead of setting the backoff counter value $N_{init}$.

On the other hand, when the channel is busy during the defer duration (2070; N), the BS determines again whether the channel is idle during a new defer duration by performing step 2060 again.

If the BS has not performed a transmission after step 4 in the above procedure, the BS may perform a transmission on the channel, if the following condition is satisfied:
if the BS is ready to transmit and the channel is sensed to be idle at least in a sensing slot duration $T_{sl}$, and if the channel has been sensed to be idle during all the sensing slot durations of a defer duration $T_d$ immediately before this transmission.

On the contrary, if the channel has not been sensed to be idle in the sensing slot duration $T_{sl}$ when the BS first senses the channel after it is ready to transmit or if the channel has not been sensed to be idle during any of the sensing slot durations of the defer duration $T_d$ immediately before this intended transmission, the BS proceeds to step 1 after sensing the channel to be idle during the sensing slot durations of the defer duration $T_{sl}$.

The defer duration $T_d$ includes a duration $T_f$ (=16 us) immediately followed by $m_p$ consecutive sensing slot durations. Each sensing slot duration $T_{sl}$ is 9 us and the duration $T_f$ includes an idle sensing slot duration $T_{sl}$ at the start of the duration $T_f$.

$CW_{min,p} \leq CW_p \leq CW_{max,p}$ is the contention window. $CW_p$ adjustment is described in subclause 2.2.3.

$CW_{min,p}$ and $CW_{max,p}$ are chosen before step 1 of the above procedure.

$m_p$, $CW_{min,p}$ and $CW_{max,p}$ are determined based on a channel access priority class associated with the BS transmission (refer to Table 13).

$X_{Thresh}$ is adjusted according to subclause 2.3.4. as described later.

TABLE 13

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 13-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If N>0 in the above procedure, when the BS transmits discovery burst(s), the BS does not decrement the counter N during the sensing slot duration(s) overlapping with the discovery burst(s).

The BS may use any channel access priority class for performing the above procedures to perform transmission(s) including discovery burst(s) satisfying the conditions described in this subclause.

The BS should use a channel access priority class applicable to unicast user plane data multiplexed in a PDSCH for performing the above procedures to perform transmission(s) including a unicast PDSCH with user plane data.

For p=3 and p=4 in Table 13, if the absence of any other technology sharing the channel may be guaranteed on a long term basis (e.g. by level of regulation), $T_{mcot,p}$ is set to 10 ms. Otherwise, $T_{mcot,p}$ is set to 8 ms.

2.3.2. Type 2 DL Channel Access Procedures

This subclause describes CAPs to be performed by the BS, for which a time duration spanned by sensing slots that are sensed to be idle before DL transmission(s) is deterministic.

Type 2A DL CAPs may be applied to the following transmission(s) performed by the BS.
  Transmission(s) initiated by a BS, including a discovery burst and not including a PDSCH, or
  transmission(s) initiated by a BS, with only a discovery burst or with a discovery burst multiplexed with non-unicast information. Herein, the transmission duration is at most 1 ms, or the transmission causes the discovery burst duty cycle to exceed 1/20. Alternatively,
  transmission(s) of a BS, following transmission(s) of a UE after a gap of 25 us in a shared channel occupancy.

Type 2B or Type 2C DL CAPs are applicable to transmission(s) performed by a BS, following transmission(s) of a UE after a gap of 16 us or up to 16 us, respectively, in a shared channel occupancy.

2.3.2.1. Type 2A DL Channel Access Procedure

The BS may perform a DL transmission immediately after sensing the channel to be idle for at least a sensing duration $T_{short\_dl}$=25 us. $T_{short\_dl}$ include a duration $T_f$ (=16 us) following one sensing slot duration. $T_f$ includes a sensing slot at the start of $T_f$. If both sensing slots of $T_{short\_dl}$ are sensed to be idle, the channel is considered to be idle for $T_{short\_dl}$.

2.3.2.2. Type 2B DL Channel Access Procedure

The BS may perform a DL transmission immediately after sensing the channel to be idle for a duration of $T_f$=16 us. $T_f$ includes a sensing slot that occurs within the last 9 us of $T_f$. The channel is considered to be idle within the duration $T_f$ if the channel is sensed to be idle for a total of 5 us at least with at least of 4 us sensing occurring in the sensing slot, the channel is considered to be idle for $T_f$.

2.3.2.3. Type 2C DL Channel Access Procedure

When the BS follows the procedure in this subclause, for a DL transmission, the BS does not sense the channel before the DL transmission. The duration of the corresponding DL transmission is at most 584 us.

2.3.3. Contention Window Adjustment Procedures

If the BS performs a transmission including a PDSCH that is associated with a channel access priority class p on a channel, the BS maintains a contention window value $CW_p$ and adjusts the contention widow value $CW_p$ before step 1 of the procedure described in subclause 2.3.1. for the transmission.

2.3.3.1. Contention Window Adjustment Procedures for Transmissions by eNB

If an eNB performs a transmission including a PDSCH that is associated with a channel access priority class p on a channel, the eNB maintains a contention window value $CW_p$ and adjusts $CW_p$ before step 1 of the procedure described in subclause 2.3.1. (i.e., before a CAP is performed) for the transmission using the following steps.

1> For every priority class $p \in \{1,2,3,4\}$, set $CW_p = CW_{min,p}$.

2> If at least Z=80% of HARQ-ACK values corresponding to PDSCH transmission(s) in a reference subframe k are determined as NACK, increase $CW_p$ for every priority class $p \in \{1,2,3,4\}$ to the next higher allowed value and remain in step 2; otherwise, go to step 1.

In other words, if the probability of HARQ-ACK values corresponding to PDSCH transmission(s) in reference subframe k being determined as NACK is at least 80%, the eNB increases a CW value set for each priority class to the next higher allowed value. Alternatively, the eNB maintains the CW value set for each priority class to be an initial value.

Reference subframe k is the starting subframe of the most recent transmission on the channel made by the eNB, for which at least some HARQ-ACK feedback is expected to be available.

The eNB adjusts the value $CW_p$ of for every priority class $p \in \{1,2,3,4\}$ based on a given reference subframe k only once.

The probability Z of HARQ-ACK values corresponding to PDSCH transmission(s) in reference subframe k being determined as NACK may be determined in consideration of the following.
  If the eNB transmission(s) for which HARQ-ACK feedback is available starts in the second slot of the subframe k, HARQ-ACK values corresponding to PDSCH transmission(s) in subframe k+1 are also used in addition to the HARQ-ACK values corresponding to PDSCH transmission(s) in the subframe k.
  If the HARQ-ACK values correspond to PDSCH transmission(s) on an LAA SCell that are assigned by an (E)PDCCH transmitted on the same LAA SCell,
    if no HARQ-ACK feedback is detected for a PDSCH transmission by the eNB or if the eNB detects 'DTX', 'NACK/DTX' or 'any' state, it is counted as NACK.

If the HARQ-ACK values correspond to PDSCH transmission(s) on another LAA SCell that are assigned by an (E)PDCCH transmitted on an LAA SCell,
  if the HARQ-ACK feedback for a PDSCH transmission is detected by the eNB, 'NACK/DTX' or 'any' state is counted as NACK, and 'DTX' state is ignored.
  If no HARQ-ACK feedback is detected for a PDSCH transmission by the eNB,
    if PUCCH format 1 with channel selection is expected to be used by the eNB, 'NACK/DTX' state corresponding to 'no transmission' is counted as NACK, and 'DTX' state corresponding to 'no transmission' is ignored.
    Otherwise, the HARQ-ACK for the PDSCH transmission is ignored.
If a PDSCH transmission has two codewords, the HARQ-ACK value of each codeword is considered separately.
A bundled HARQ-ACK across M subframes is considered as M HARQ-ACK responses.

If the eNB performs a transmission including a PDCCH/EPDCCH with DCI format 0A/0B/4A/4B and not including a PDSCH associated with a channel access priority class p on a channel starting from time $t_0$, the eNB maintains the contention window value $CW_p$ and adjusts $CW_p$ before step 1 of the procedure described in subclause 2.3.1. for the transmission using the following steps.

1> For every priority class $p \in \{1,2,3,4\}$, set $CW_p = CW_{min,p}$.
2> If less than 10% of UL transport blocks scheduled by the eNB using the Type 2 CAP (described in subclause 2.3.1.2) in the time duration between $t_0$ and $t_0+T_{CO}$ have been received successfully, increase $CW_p$ for every priority class $p \in \{1, 2, 3, 4\}$ to the next higher allowed value and remain in step 2; otherwise, go to step 1.

$T_{CO}$ is computed as described in subclause 2.3.1. which will be described below.

If $CW_p = CW_{max,p}$ is used K times consecutively to generate $N_{init}$, only $CW_p$ for a priority class p for $CW_p = CW_{max,p}$ used K times consecutively is reset to $CW_{min,p}$. K is selected from a set of values $\{1, 2, \ldots, 8\}$ for every priority class $p \in \{1,2,3,4\}$ by the eNB.

2.3.3.2. Contention Window Adjustment Procedures for DL Transmissions by gNB If a gNB performs a transmission including a PDSCH that is associated with a channel access priority class p on a channel, the gNB maintains a contention window value $CW_p$ and adjusts $CW_p$ before step 1 of the procedure described in subclause 2.3.1. (i.e., before a CAP is performed) for the transmission using the following steps.

1> For every priority class $p \in \{1,2,3,4\}$, set $CW_p = CW_p = CW_{min,p}$.

2> If HARQ-ACK feedback is available after the last update of $CW_p$, go to step 3. Otherwise, if the gNB transmission after the procedure described in subclause 2.3.1 does not include a retransmission or is performed within a duration $T_w$ from the end of a reference duration corresponding to the earliest DL transmission burst after the last update of $CW_p$ transmitted after the procedure described in subclause 2.3.1, go to step 5; otherwise go to step 4.

3> The HARQ-ACK feedback(s) corresponding to PDSCH(s) in the reference duration for the latest DL transmission burst for which HARQ-ACK feedback is available is used as follows.

a. If at least one HARQ-ACK feedback is 'ACK' for PDSCH(s) with TB-based transmissions or at least 10% of HARQ-ACK feedbacks is 'ACK' for PDSCH(s) with CBG-based transmissions, go to step 1; otherwise go to step 4.

4> Increase $CW_p$ for every priority class $p \in \{1,2,3,4\}$ to the next higher allowed value.

5> For every priority class $p \in \{1,2,3,4\}$, maintain $CW_p$ as it is; go to step 2.

The reference duration and the duration Tw in the above procedure are defined as follows.

The reference duration corresponding to a channel occupancy initiated by the gNB, including transmission of PDSCH(s) is defined in this subclause as a duration starting from the beginning of the channel occupancy until the end of the first slot in which at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst from the gNB within the channel occupancy that contains unicast PDSCH(s) is the reference duration for CWS adjustment.

$T_w = \max(T_A, T_B+1 \text{ ms})$ where $T_B$ is the duration of the transmission burst from the start of the reference duration in ms, If the absence of any other technology sharing the channel may not be guaranteed on a long-term basis, $T_A = 5$ ms, and otherwise, $T_A = 10$ ms.

If the gNB performs a transmission using the Type 1 CAP associated with a channel access priority class p on a channel and the transmission is not associated with an explicit HARQ-ACK feedback by the corresponding UE(s), the gNB adjusts $CW_p$ before step 1 in the procedure described in subclause 2.3.1., using the latest $CW_p$ used for any DL transmission on the channel using the Type 1 CAP associated with the channel access priority class p. If the corresponding channel access priority class p has not been used for any DL transmission on the channel, $CW_p = CW_{min,p}$ is used.

2.3.3.3. Common procedures for CWS adjustments for DL transmissions

The following applies to the procedures described in subclauses 2.3.3.1. and 2.3.3.2.
  If $CW_p = CW_{max,p}$, the next higher allowed value for adjusting $CW_p$ is $CW_{max,p}$.
  If $CW_p = CW_{max,p}$ is consecutively used K times for generation of $N_{init}$, $CW_p$ is reset to $CW_{min}$ only for that priority class p for which $CW_p = CW_{max,p}$ is consecutively used K times for generation of $N_{init}$. K is selected by the eNB/gNB from the set of values $\{1, 2, \ldots, 8\}$ for each priority class $p \in \{1,2,3,4\}$.

2.3.4. Energy Detection Threshold Adaptation Procedure

An eNB/gNB accessing a channel on which transmission(s) are performed sets an energy detection threshold $X_{Thresh}$ to be less than or equal to a maximum energy detection threshold $X_{Thresh\_max}$.

The maximum energy detection threshold $X_{Thresh\_max}$ is determined as follows.

If the absence of any other technology sharing the channel may be guaranteed on a long-term basis (e.g. by level of regulation) then:

$$-X_{Thresh\_max} = \min\left\{ \begin{array}{l} T_{max} + 10 \text{ dB,} \\ X_r \end{array} \right\}$$

$X_r$ is a maximum energy detection threshold in dBm defined by regulatory requirements, when such requirements are defined, and otherwise $X_r = T_{max} + 10$ dB.
Otherwise, $$X_{Thres\_max} = \max\left\{ \begin{array}{l} -72 + 10 \cdot \log 10(BW \text{ MHz}/20 \text{ MHz}) \text{ dBm,} \\ \min\left\{ \begin{array}{l} T_{max}, \\ T_{max} - T_A + (P_H + 10 \cdot \log 10(BW \text{ MHz}/20 \text{ MHz}) - P_{TX}) \end{array} \right\} \end{array} \right\}$$

where each parameter is defined as follows:
$T_A=10$ dB for transmission(s) including PDSCH;
$T_A=5$ dB for transmissions including discovery burst(s) as described in subclause 4.1.2;
$P_H=23$ dBm dBm;
$P_{TX}$ is the set maximum eNB/gNB output power in dBm for the channel;
eNB/gNB uses the set maximum transmission power over a single channel irrespective of whether single channel or multi-channel transmission is employed
$T_{max}(dBm) = 10 \cdot \log 10(3.16228 \cdot 10^{-8}(mW/MHz) \cdot BW \text{ MHz (MHz)})$:
BW MHz is the single channel bandwidth in MHz.

2.3.5. Channel Access Procedure for Transmission(s) on Multiple Channels

An eNB/gNB may access multiple channels on which transmission(s) are performed, according to one of the Type A or Type B procedures described below.

2.3.5.1. Type A Multi-Channel Access Procedure

An eNB/gNB performs channel access on each channel $c_i \in C$ according to the procedure described in this subclause. Herein, C is a set of channels on which the eNB/gNB intends to transmit, and i=0, 1, . . . q−1 where q is the number of channels on which the eNB/gNB intends to transmit.
The counter N described in subclause 2.3.1. (i.e., the counter N considered in a CAP) is determined for each channel $c_i$ and is denoted as $N_{c_i}$. $N_{c_i}$ is maintained according to subclause 2.3.5.1.1. or 2.3.5.1.2.

2.3.5.1.1. Type A1 Multi-Channel Access Procedure

The counter N as described in subclause 2.3.1. (i.e., the counter N considered in a CAP) is independently determined for each channel $c_i$ and is denoted as $N_{c_i}$.
In the case where the eNB/gNB ceases a transmission on any one channel $c_j \in C$, if the absence of any other technology sharing the channel may not be guaranteed on a long term basis (e.g. by level of regulation), for each channel $c_i$ ($c_i$ is different from $c_j$, $c_i \neq c_j$), the eNB/gNB may resume decrementing $N_{c_i}$ when idle sensing slots are detected either after waiting for a duration of $4 \cdot T_{sl}$ or after reinitializing $N_{c_i}$.

2.3.5.1.2. Type A2 Multi-Channel Access Procedure

For each channel $c_j \in C$, the counter N is determined as described in subclause 2.3.1. and denoted as $N_{c_j}$, where $c_j$ is a channel that has the largest $CW_p$ value. For each channel $c_i$, $N_{c_i} = N_{c_j}$.
When the eNB/gNB ceases a transmission on any one channel for which $N_{c_i}$ is determined, the eNB/gNB reinitializes $N_{c_i}$ for all channels.

2.3.5.2. Type B Multi-Channel Access Procedure

A channel $c_j \in C$ may be selected by the eNB/gNB as follows.
The eNB/gNB selects $c_j$ by uniformly randomly choosing $c_j$ from C before each transmission on multiple channels $c_i \in C$, or
the eNB/gNB selects $c_j$ no more frequently than once every 1 second.
Herein, C is a set of channels on which the eNB/gNB intends to transmit, and i=0, 1, . . . q−1 where q is the number of channels on which the eNB/gNB intends to transmit.
To transmit on a channel $c_j$, the eNB/gNB performs channel access on the channel $c_j$ according to the procedure described in subclause 2.2.1. with the modifications described in subclause 2.3.5.2.1. or 2.3.5.2.2.
To transmit on a channel $c_i \neq c_j$ among channels $c_i \in C$,
for each channel $c_i$, the eNB/gNB senses the channel $c_i$ for at least a sensing interval $T_{mc}=25$ us immediately before the transmission on the channel $c_j$. The eNB/gNB may perform a transmission on the channel $c_i$ immediately after sensing the channel $c_i$ to be idle for at least a sensing duration $T_{mc}$. The channel $c_i$ may be considered to be idle for $T_{mc}$ if the channel is sensed to be idle during all the time durations in which such idle sensing is performed on the channel $c_j$ in the given duration $T_{mc}$.
The eNB/gNB does not perform a transmission on a channel $c_i \neq c_j$ (where $c_i \in C$), for a period exceeding $T_{mcot,p}$ as given in Table 12, where the value of $T_{mcot,p}$ is determined using the channel access parameters used for the channel $c_j$.
For the procedure in this subclause, the channel frequencies of the set C of channels selected by the gNB is a subset of one of predefined sets of channel frequencies.

2.3.5.2.1. Type B1 Multi-Channel Access Procedure

A single $CW_p$ value is maintained for a set of channels C.
For determining $CW_p$ for channel access on a channel $c_j$, step 2 of the procedure described in subclause 2.3.3. is modified as follows.
If at least Z=80% of HARQ-ACK values corresponding to PDSCH transmission(s) in reference subframe k of all channels $c_i \in C$ are determined as NACK, increase $CW_p$ for each priority class $p \in \{1,2,3,4\}$ to the next higher allowed value; otherwise, go to step 1.
For determining $CW_p$ for a set of channels C, any PDSCH that fully or partially overlaps with any channel $c_i \in C$ may be used in the procedure described in subclause 2.3.3.2.

2.3.5.2.2. Type B2 Multi-Channel Access Procedure

A value $CW_p$ is maintained independently for each channel $c_i \in C$ using the procedure described in subclause 2.3.3. For determining $CW_p$ for a channel $c_i$, any PDSCH that fully or partially overlaps with the channel $c_i$ may be used in the procedure described in subclause 2.3.3.2. For determining $N_{init}$ for the channel $c_j$, the $CW_p$ value of a channel $c_{j1} \in C$ is used, where $c_{j1}$ is the channel with a largest $CW_p$ among all channels in the set C.

2.4. Uplink Channel Access Procedures

A UE and a BS scheduling or configuring UL transmission(s) for the UE perform the following procedures for the UE to access channel(s) (on which LAA SCell transmission(s) are performed). On the assumption of a PCell being a licensed band and one or more SCells being an unlicensed band are basically configured for the UE and the BS, the following description is given of a UL CAP to which various embodiments of the present disclosure are applied However, the UL CAP may also be applied in the same manner, when only an unlicensed band is configured for the UE and the BS.

2.4.1. Channel Access Procedures for Uplink Transmission(s)

The UE may access a channel on which UL transmission(s) are performed according to one of the Type 1 or Type 2 UL CAP. The Type 1 CAP is described in subclause 2.3.1.1. The Type 2 CAP is described in subclause 2.3.1.2.

If a UL grant scheduling a PUSCH transmission indicates the Type 1 CAP, the UE performs the Type 1 CAP for performing transmissions including a PUSCH transmission, unless stated otherwise in this subclause.

If a UL grant scheduling a PUSCH transmission indicates the Type 2 CAP, the UE performs the Type 2 CAP for performing transmissions including a PUSCH transmission, unless stated otherwise in this subclause.

The UE performs the Type 1 CAP for performing a transmission including an autonomous PUSCH transmission in configured UL resources, unless stated otherwise in this subclause.

The UE performs the Type 1 CAP for performing SRS transmissions not including a PUSCH transmission. A UL channel access priority class p=1 is used for SRS transmissions not including a PUSCH.

TABLE 14

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 μs. The maximum duration before including any such gap shall be 6 ms.

2.4.1.1. Channel Access Procedures and UL-Related Signaling

If a UE detects a 'UL configuration for LAA' field and/or a 'UL duration and offset' field (e.g., in DCI format 1C), the following is applicable.

If the 'UL configuration for LAA' field and/or the 'UL duration and offset' field configures and/or indicates 'UL offset' l and 'UL duration' d for subframe n, then the UE may use the Type 2 CAP for transmissions in subframe n+l+i (where i=0, 1, . . . d−1), irrespective of a channel access type signaled in a UL grant for those subframes, if the end of a UE transmission occurs in or before subframe n+l+d−1.

If the 'UL configuration for LAA' field and/or the 'UL duration and offset' field configures and/or indicates 'UL offset' l and an 'UL duration' d for subframe n and a 'COT sharing indication for AUL' field is set to '1', then a UE configured with autonomous UL may use the Type 2 CAP for autonomous UL transmission(s), assuming any priority class in subframes n+l+i (where i=0, 1, . . . d−1), if the end of the UE autonomous UL transmission occurs in or before subframe n+l+d−1 and the autonomous UL transmissions between n+l and n+l+d−1 are contiguous.

If the 'UL configuration for LAA' field and/or the 'UL duration and offset' field indicates 'UL offset' l and an 'UL duration' d for subframe n and the 'COT sharing indication for AUL' field is set to '0', then a UE configured with autonomous UL should not transmit autonomous UL in subframe n+l+i (where i=0, 1, . . . d−1).

2.4.1.2. Channel Access Procedures for Consecutive UL Transmission(s)

For contiguous UL transmission(s), the following is applicable.

If a UE is scheduled to perform a set of UL transmission(s) including a PUSCH using a UL grant, and if the UE may not access the channel for a transmission in the set prior to the last transmission, the UE should attempt to transmit a next transmission according to a channel access type indicated by the UL grant.

If the UE is scheduled to perform a set of consecutive UL transmissions without gaps including a PUSCH using one or more UL grants, and if the UE transmits one of the scheduled UL transmissions in the set after accessing the channel according to one of the Type 1 or Type 2 UL CAP, the UE may continue transmission of the remaining UL transmissions in the set, if any.

The UE does not expect different channel access types to be indicated for any consecutive UL transmissions without gaps between the transmissions.

For contiguous UL transmissions(s) including a transmission pause, the following is applicable.

If a UE is scheduled to perform a set of consecutive UL transmissions without gaps using one or more UL grants, if the UE has stopped transmitting during or before one of these UL transmissions in the set and prior to the last UL transmission in the set, and if the channel is sensed by the UE to be continuously idle after the UE has stopped transmitting, the UE may transmit a later UL transmission in the set using the Type 2 CAP.

If a channel sensed by the UE is not continuously idle after the UE has stopped transmitting, the UE may perform a later UL transmission in the set using the Type 1 CAP with a UL channel access priority class indicated in the DCI corresponding to the UL transmission.

2.4.1.3. Conditions for Maintaining Type 1 UL Channel Access Procedures

If a UE receives DCI indicating a UL grant scheduling a PUSCH transmission using the Type 1 CAP and/or DCI indicating a DL grant scheduling a PUCCH transmission using the Type 1 CAP, and if the UE has an ongoing Type 1 CAP before the PUSCH or PUCCH transmission starting time,

- if the UL channel access priority class value $p_1$ used for the ongoing Type 1 CAP is equal to or larger than a UL channel access priority class value $p_2$ indicated by the DCI, the UE may perform the PUSCH transmission in response to the UL grant by accessing the channel by using the ongoing Type 1 CAP.
- If the UL channel access priority class value $p_1$ used for the ongoing Type 1 CAP is less than the UL channel access priority class value $p_2$ indicated by the DCI, the UE terminates the ongoing CAP.

The UE may perform a PUCCH transmission in response to the DL grant by accessing the channel by using the ongoing Type 1 CAP.

2.4.1.4. Conditions for Indicating Type 2 Channel Access Procedures

If the BS has transmitted on the channel according to the CAP described in subclause 2.3.1, the BS may indicate the Type 2 CAP in DCI of a UL grant which schedules a transmission including a PUSCH on a channel in subframe n.

Alternatively, when the BS has transmitted on the channel according to the CAP described in subclause 2.3.1., the BS may indicate, the BS may indicate, using the 'UL Configuration for LAA' field and/or the 'UL duration and offset' field, that the UE may perform the Type 2 CAP for transmissions including a PUSCH on a channel in subframe n.

Alternatively, if the UL transmission occurs within a time interval starting at $t_0$ and ending at $t_0+T_{CO}$, the BS may schedule a UL transmission on a channel, which follows a transmission by the BS on that channel with the Type 2A CAP for the UL transmission. Herein, $T_{CO}=T_{m,cot,p}+T_g$ and each parameter may be defined as follows.

- $t_0$: a time instant when the BS has started a transmission.
- $T_{mcot,p}$: a value determined by the BS as described in subclause 2.2.
- $T_g$: the total duration of all gaps of a duration greater than 25 us that occur between the DL transmission of the BS and a UL transmission scheduled by the BS, and between any two UL transmissions scheduled by the BS, starting from $t_0$.

If the UL transmissions may be scheduled contiguously, the BS schedules the UL transmissions without gaps between the consecutive UL transmissions within $t_0$ and $t_0+T_{CO}$.

For a UL transmission on the channel following a transmission of the BS on the channel within a duration $T_{short\_ul}=25$ us, the UE may perform the Type 2A CAP for the UL transmission.

If the BS indicates the Type 2 CAP for the UE by the DCI, the BS indicates the channel access priority class used to obtain access to the channel by the DCI.

2.4.1.5. Channel Access Procedure for UL Multi-Channel Transmission(s)

If a UE

- is scheduled to transmit on a set of channels C, if the Type 1 CAP is indicated by UL scheduling grants for UL transmissions on the set of channels C, and if the UL transmissions are scheduled to start at the same time on all channels in the set of channels C, and/or
- intends to perform a UL transmission on configured resources on the set of channels C with the Type 1 CAP, and if the channel frequencies of the set of channels C is a subset of one of the sets of preconfigured channel frequencies,

- the UE may transmit on a channel $c_i \in C$ using the Type 2 CAP.
  - If the Type 2 CAP is performed on the channel $c_i$ immediately before the UE transmission on the channel $c_j \in C$ (where $i \neq j$), and
- if the UE has accessed a channel $c_j$ using the Type 1 CAP, the channel $c_j$ is selected by the UE uniformly randomly from the set of channels C before performing the Type 1 CAP on any channel in the set of channels C.
- If the UE fails to access any of the channels, the UE may not transmit on the channel $c_i \in C$ within the bandwidth of a carrier of a carrier bandwidth, on which the UE is scheduled or configured by UL resources.

2.4.2. Type 1 UL Channel Access Procedure

This subclause describes a CAP performed by a UE, in which a time duration spanned by sensing slots that are sensed to be idle before a UL transmission(s) is random. The subclause is applicable to the following transmissions.

- PUSCH/SRS transmission(s) scheduled or configured by the BS.
- PUCCH transmission(s) scheduled or configured by the BS.
- Transmission(s) related to a random access procedure (RAP).

The UE may perform a transmission using the Type 1 CAP after a channel is sensed to be idle during the slot durations of a defer duration $T_d$, and a counter N is zero in step 4. The counter N is adjusted by sensing the channel for additional slot duration(s) according to the following procedure.

1) Set $N=N_{init}$ where $N_{init}$ is a random number uniformly distributed between 0 and $CW_p$, and go to step 4.
2) If $N>0$ and the UE chooses to decrement the counter, set $N=N-1$.
3) Sense the channel for an additional slot duration, and if the additional slot duration is idle, go to step 4; else, go to step 5.
4) If $N=0$, stop; else, go to step 2.
5) Sense the channel until either a busy slot is detected within an additional defer duration $T_d$ or all the slots of the additional defer duration $T_d$ are detected to be idle.
6) If the channel is sensed to be idle during all the slot durations of the additional defer duration $T_d$, go to step 4; else, go to step 5.

Figure 15:
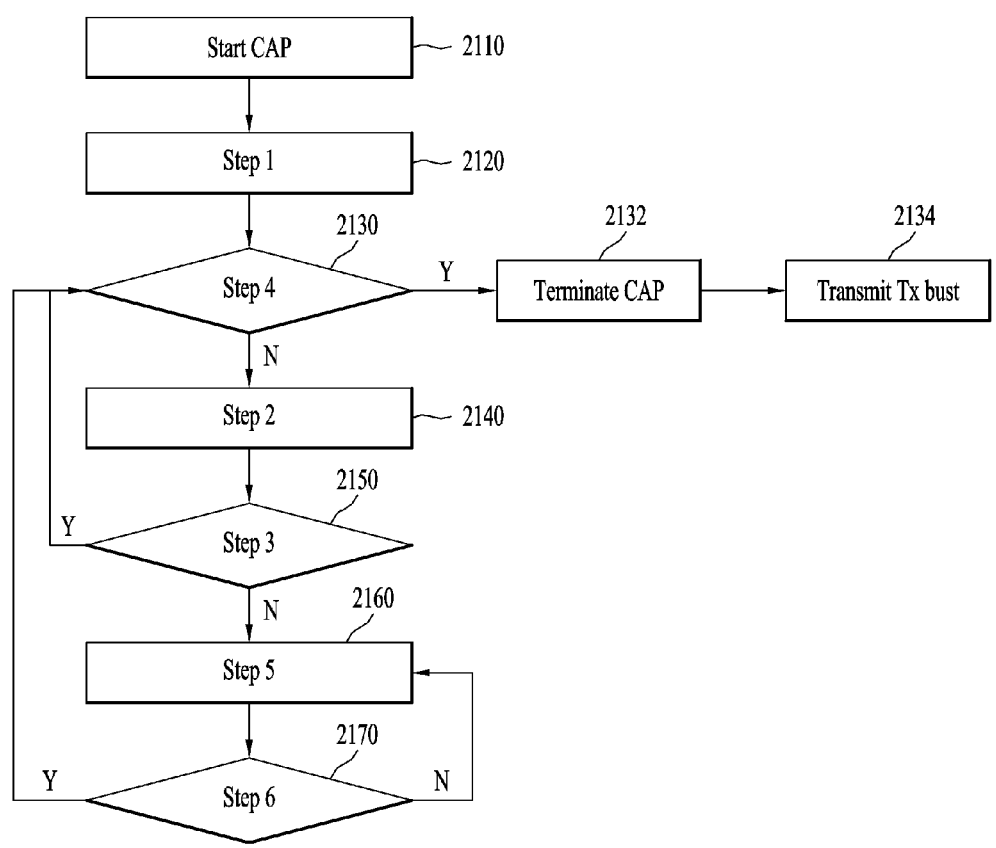
FIG. 15 is a flowchart illustrating a UL CAP for transmission in an unlicensed band, to which various embodiments of the present disclosure are applicable.

FIG. 15 is a diagram illustrating a UL CAP for transmission in an unlicensed band to which various embodiments of the present disclosure are applicable.

The afore-described Type 1 UL CAP of a UE may be summarized as follows.

For a UL transmission, a transmission node (e.g., a UE) may initiate a CAP to operate in an unlicensed band (2110).

The UE may select a backoff counter N randomly within a CW according to step 1. N is set to an initial value $N_{init}$ (2120). $N_{init}$ is a value randomly selected between 0 and $CW_p$.

Subsequently, when the backoff counter value N is 0 according to step 4 (2130; Y), the UE ends the CAP (2132). The UE may then transmit a Tx burst (2134). On the other hand, if the backoff counter value is not 0 (2130; N), the UE decrements the backoff counter value by 1 according to step 2 (2140).

Subsequently, the UE checks whether a channel is idle (2150). If the channel is idle (2150; Y), the UE checks whether the backoff counter value is 0 (2130).

On the contrary, if the channel is not idle, that is, the channel is busy (2150; N), the UE checks whether the channel is idle for a defer duration $T_d$ (of 25 usec or more) longer than a slot duration (e.g., 9 usec) according to step 5 (2160). If the channel is idle for the defer duration (2170; Y), the UE may resume the CAP.

For example, if the backoff counter value $N_{init}$ is 10 and the channel is determined to be idle after the backoff counter value is decremented to 5, the UE senses the channel for the defer duration and determines whether the channel is idle. If the channel is idle for the defer duration, the UE may perform the CAP again from the backoff counter value 5 (or the backoff counter value 4 after decrementing the backoff counter value by 1), instead of setting the backoff counter value $N_{init}$.

On the other hand, if the channel is busy for the defer duration (2170; N), the UE checks again whether the channel is idle for a new defer duration by performing operation 2160 again.

If the UE has not performed a UL transmission on a channel on which UL transmission(s) are performed after step 4 in the above procedure, the UE may perform a UL transmission on the channel, if the following condition is satisfied:

if the channel is sensed to be idle at least in a sensing slot duration $T_{sl}$ when the UE is ready to perform the transmission; and if the channel has been sensed to be idle during all the slot durations of a defer duration $T_d$ immediately before the transmission.

On the contrary, if the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of the defer duration $T_d$.

The defer duration $T_d$ includes a duration $T_f$ (=16 us) immediately followed by $m_p$ consecutive slot durations where each slot duration $T_{sl}$ is 9 us, and $T_f$ includes an idle slot duration $T_{sl}$ at the start of $T_f$.

$CW_{min,p} \leq CW_p \leq CW_{max,p}$ is the contention window. $CW_p$ adjustment is described in subclause 2.3.2.

$CW_{min,p}$ and $CW_{max,p}$ are chosen before step 1 of the above procedure.

$m_p$, $CW_{min,p}$ and $CW_{max,p}$ are based on a channel access priority class signaled to the UE (see Table 18).

$X_{Thresh}$ is adjusted according to subclause 2.3.3. as described below.

2.4.3. Type 2 UL Channel Access Procedure

This subclause describes a CAP performed by a UE, in which a time duration spanned by sensing slots sensed to be idle before a UL transmission(s) is deterministic.

If the UE is indicated by the BS to perform the Type 2 UL CAP, the UE follows the procedure described in subclause 2.4.3.1.

2.4.3.1. Type 2A UL Channel Access Procedure

If the UE is indicated to perform the Type 2A UL CAP, the UE uses the Type 2A UL CAP for a UL transmission. The UE may perform the transmission immediately after sensing the channel to be idle for at least a sensing duration $T_{short\_ul}$=25 us. $T_{short\_ul}$ includes a duration $T_f$=16 us immediately followed by one slot sensing slot duration $T_{sl}$=9 us, and $T_f$ includes a sensing slot at the start of $T_f$. The channel is considered to be idle for $T_{short\_ul}$, if both sensing slots of $T_{short\_ul}$ are sensed to be idle.

2.4.3.2. Type 2B UL Channel Access Procedure

If the UE is indicated to perform a Type 2B UL CAP, the UE uses the Type 2B UL CAP for a UL transmission. The UE may perform the transmission immediately after sensing the channel to be idle within a duration of $T_f$=16 us. $T_f$ includes a sensing slot that occurs within the last 9 us of $T_f$. The channel is considered to be idle within the duration $T_f$, if the channel is sensed to be idle for a total of at least 5 us with at least of 4 us sensing occurring in the sensing slot.

2.4.3.3. Type 2C UL Channel Access Procedure

If the UE is indicated to perform a Type 2C UL CAP for a UL transmission, the UE does not sense the channel before the transmission. The duration of the corresponding UL transmission is at most 584 us.

2.4.4. Contention Window Adjustment Procedure

If the UE performs a transmission associated with a channel access priority class p on a channel, the UE maintains the contention window value $CW_p$ and adjusts $CW_p$ for the transmission before step 1 of the procedure described in subclause 2.4.2. (i.e., before a CAP is performed).

2.4.4.1. Contention Window Adjustment Procedure for UL Transmission Scheduled/Configured by eNB If the UE performs a transmission using the Type 1 CAP associated with a channel access priority class p on a channel, the UE maintains the contention window value $CW_p$ and adjusts $CW_p$ for the transmission before step 1 of the procedure described in subclause 2.4.1. (i.e., before the CAP is performed), using the following procedure.

If the UE receives a UL grant and/or an autonomous uplink downlink feedback information (AUL-DFI), the contention window size for all the priority classes is adjusted as follows.

If a new data indicator (NDI) value for at least one HARQ process associated with HARQ_ID_ref is toggled, and/or if the HARQ-ACK value(s) for at least one of the HARQ processes associated with HARQ_ID_ref received in the earliest AUL-DFI after $n_{ref}$+3 indicates ACK, for every priority class p∈{1,2,3,4}, set $CW_p=CW_{min,p}$.

Otherwise, increase $CW_p$ for every priority class p∈{1, 2,3,4} to the next higher allowed value.

Herein, HARQ_ID_ref is the HARQ process ID of a UL-SCH in reference subframe $n_{ref}$. The reference subframe $n_{ref}$ is determined as follows.

If the UE receives a UL grant in subframe $n_g$, subframe $n_w$ is the most recent subframe before subframe $n_g-3$ in which the UE has transmitted a UL-SCH using the Type 1 CAP.

If the UE performs transmissions including a UL-SCH without gaps starting with subframe $n_0$ and in subframes $n_0, n_1, \ldots, n_w$, reference subframe $n_{ref}$ is subframe no.

Otherwise, reference subframe $n_{ref}$ is subframe $n_w$.

If the UE is scheduled to perform transmissions without gaps including a PUSCH in a set of subframes $n_0, n_1, \ldots, n_{w-1}$ using the Type 1 CAP, and if the UE is not able to perform any transmission including a PUSCH in the set of subframes, the UE may keep the value $CW_p$ unchanged for every priority class p∈{1,2,3,4}.

If the reference subframe for the last scheduled transmission is also $n_{ref}$, the UE may keep the value $CW_p$ for every priority class p∈{1,2,3,4} the same as that for the last scheduled transmission including a PUSCH using the Type 1 CAP.

If $CW_p=CW_{max,p}$, the next higher allowed value for adjusting $CW_p$ is $CW_{max,p}$.

If $CW_p=CW_{max,p}$ is consecutively used K times for generation of $N_{init}$, $CW_p$ is reset to $CW_{min,p}$ only for that priority class p for which $CW_p=CW_{max,p}$ is consecutively used K times for generation of $N_{init}$. K is selected by the UE from the set of values {1, 2, ..., 8} for each priority class p∈{1,2,3,4}.

2.4.4.2. Contention Window Adjustment Procedures for UL Transmissions Scheduled/Configured by gNB If the UE performs transmissions using the Type 1 CAP associated with a channel access priority class p on a channel, the UE maintains the contention window value $CW_p$ and adjusts $CW_p$ for those transmissions before step 1 of the procedure described in subclause 2.4.1. (i.e., before the CAP is performed), using the following steps.

1> For every priority class p∈{1,2,3,4}, set $CW_p=CW_{max,p}$.

2> If an HARQ-ACK feedback is available after the last update of $CW_p$, go to step 3. Otherwise, if the UE transmission after the procedure described in subclause 2.4.1. does not include a retransmission or is performed within a duration $T_w$ from the end of a reference duration corresponding to the earliest UL transmission burst after the last update of $CW_p$ transmitted after the procedure described in subclause 2.4.1., go to step 5; otherwise go to step 4.

3> The HARQ-ACK feedback(s) corresponding to PUSCH(s) in the reference duration for the latest UL transmission burst for which an HARQ-ACK feedback is available is used as follows.

a. If at least one HARQ-ACK feedback is 'ACK' for PUSCH(s) with TB-based transmissions or at least 10% of HARQ-ACK feedbacks is 'ACK' for PUSCH(s) with CBG-based transmissions, go to step 1; otherwise go to step 4.

4> Increase $CW_p$ for every priority class p∈{1,2,3,4} to the next higher allowed value.

5> For every priority class p∈{1,2,3,4}, maintain $CW_p$ as it is; go to step 2.

The HARQ-ACK feedback, reference duration and duration Tw in the above procedure are defined as follows.

HARQ-ACK feedback for PUSCH(s) transmissions is expected to be provided to UE(s) explicitly or implicitly where implicit HARQ-ACK feedback for the purpose of contention window adjustment in this subclause is determined based on an indication for a new transmission or retransmission in DCI scheduling PUSCH(s) as follows.

If a new transmission is indicated, 'ACK' is assumed for the TBs or CBGs in the corresponding PUSCH(s) for the TB-based and CBG-based transmission, respectively.

If a retransmission is indicated for TB-based transmissions, 'NACK' is assumed for the TBs in the corresponding PUSCH(s).

If a retransmission is indicated for CBG-based transmissions, and if a bit value in a code block group transmission information (CBGTI) field is '0' or '1', 'ACK' or 'NACK' is assumed for the corresponding CBG in the corresponding PUSCH(s), respectively.

The reference duration corresponding to a channel occupancy initiated by the UE, including transmission of PUSCH(s) is defined in this subclause as a duration starting from the beginning of the channel occupancy until the end of the first slot where at least one unicast PUSCH is transmitted over all the resources allocated for the PDSCH, or until the end of the first transmission burst by the gNB that contains unicast PUSCH(s) transmitted over all the resources allocated for the PDSCH, whichever occurs earlier. If the channel occupancy includes a unicast PUSCH, but it does not include any unicast PUSCH transmitted over all the resources allocated for that PUSCH, then, the duration of the first transmission burst by the UE within the channel occupancy that contains PUSCH(s) is the reference duration for CWS adjustment.

$T_w=\max(T_A, T_B+1 \text{ ms})$ where $T_B$ is the duration in ms of a transmission burst from the start of the reference duration. If the absence of any other technology sharing the channel may not be guaranteed on a long-term basis (e.g. by level of regulation), $T_A=5$ ms, and otherwise, $T_A=10$ ms.

If the UE performs transmissions using the Type 1 CAP associated with a channel access priority class p on a channel and the transmissions are not associated with explicit or implicit HARQ-ACK feedbacks as described above in this subclause, the UE adjusts $CW_p$ before step 1 in the procedure described in subclause 2.4.1., using the latest $CW_p$ used for any UL transmissions on the channel using the Type 1 CAP associated with the channel access priority class p. If the corresponding channel access priority class p has not been used for any UL transmission on the channel, $CW_p=CW_{min,p}$ is used.

2.4.4.3. Common Procedures for CWS Adjustments for UL Transmissions

The following applies to the procedures described in subclauses 2.4.4.1 and 2.4.4.2.

If $CW_p=CW_{max,p}$, the next higher allowed value for adjusting $CW_p$ is $CW_{max,p}$.

If $CW_p=CW_{max,p}$ is consecutively used K times for generation of $N_{init}$, $CW_p$ is reset to $CW_{min}$ only for that priority class p for which $CW_p=CW_{max,p}$ is consecutively used K times for generation of $N_{init}$. K is selected by the UE from the set of values $\{1, 2, \ldots, 8\}$ for each priority class $p \in \{1,2,3,4\}$.

2.4.5. Energy Detection Threshold Adaptation Procedure

A UE accessing a channel on which UL transmission(s) are performed should set an energy detection threshold $X_{Thresh}$ to be less than or equal to a maximum energy detection threshold $X_{Thresh\_max}$.

The maximum energy detection threshold $X_{Thresh\_max}$ is determined as follows.

If the UE is configured with a higher layer parameter maxEnergyDetectionThreshold-r14 and/or maxEnergyDetectionThreshold-r16, $X_{Thresh\_max}$ is set to be equal to a value signaled by the higher-layer parameter.

Otherwise, the UE should determine $X'_{Thresh\_max}$ according to the procedure described in subclause 2.3.3.1.

If the UE is configured with a higher layer parameter energyDetectionThresholdOffset-r14 and/or energyDetectionThresholdOffset-r16, $X'_{Thresh\_max}$ is set by adjusting $X_{Thresh\_max}$ according to an offset value signaled by the higher-layer parameter.

Otherwise, the UE sets $X_{Thresh\_max} = X'_{Thresh\_max}$.

2.3.3.1. Default Maximum Energy Detection Threshold Computation Procedure

If the higher-layer parameter 'absenceofAnyOtherTechnology-r14' and/or 'absenceofAnyOtherTechnology-r16' is provided:

$$X'_{Thresh\_max} = \min\left\{\begin{array}{l} T_{max} + 10 \text{ dB,} \\ X_r \end{array}\right\}$$

where $X_r$ is a maximum energy detection threshold defined in dBm by regulatory requirements when such requirements are defined. Otherwise $X_r = T_{max} + 10$ dB Otherwise:

$$X'_{Thres\_max} = \max\left\{\begin{array}{l} -72 + 10 \cdot \log10(BWMHz/20 \text{ MHz}) \text{ dBm,} \\ \min\left\{\begin{array}{l} T_{max}, \\ T_{max} - T_A + (P_H + 10 \cdot \log10(BWMHz/20 \text{ MHz}) - P_{TX}) \end{array}\right\} \end{array}\right\}$$

where $T_A = 10$ dB $P_H = 23$ dBm;

$P_{TX}$ is the set to the value of $P_{CMAX\_H,c}$ $T_{max}(dBm) = 10 \cdot \log 10(3.16228 \cdot 10^{-8}(mW/MHz) \cdot BW \text{ MHz (MHz)})$ BW MHz is the single channel bandwidth in MHz.

3. HARQ (Hybrid Automatic Repeat and Request) 과정

3. HARQ (Hybrid Automatic Repeat And Request) Process

3.1. General Procedure

In a wireless communication system, in the presence of multiple UEs having UL/DL data to be transmitted/received, a BS selects a UE for data transmission in each transmission time interval (TTI) (e.g., subframe or slot). In a multi-carrier system or a system operating in a similar manner, the BS selects UEs to transmit/receive UL/DL data in each TTI and frequency bands for use in the data transmissions/receptions of the UEs.

On UL, UEs transmit UL reference signals (RSs) (or pilots) to the BS, and the BS identifies the channel states of the UEs based on the received RSs and selects a UE to transmit UL data in each unit frequency band during each TTI. The BS indicates the results of this operation to the UEs. That is, the BS transmits a UL allocation message requesting a UE, which has been scheduled for UL transmission in a specific TTI, to transmit data in a specific frequency band. The UL allocation message is also referred to as a UL grant. The UE transmits UL data according to the UL allocation message. The UL allocation message may include a UE identity (ID), RB allocation information, a modulation and coding scheme (MCS), a redundancy version (RV), a new data indication (NDI), and so on.

In synchronous HARQ, a retransmission timing (e.g., four subframes after the reception time of a NACK) is preset at the system level. Accordingly, the BS transmits a UL grant message to the UE only for an initial transmission, and subsequent retransmissions are performed based on ACK/NACK signals (e.g., PHICH signals). In asynchronous HARQ, a retransmission timing is not preset and thus the BS should transmit a retransmission request message to the UE. Further, the same frequency resources or MCS is used for a previous transmission and a retransmission in non-adaptive HARQ, whereas different frequency resources or a different MCS may be used for a previous transmission and a retransmission in adaptive HARQ. For example, because frequency resources or an MCS for retransmission changes at each transmission timing in asynchronous adaptive HARQ, the retransmission request message may include a UE ID, RB allocation information, an HARQ process ID/number, an RV, and NDI information.

Figure 16:
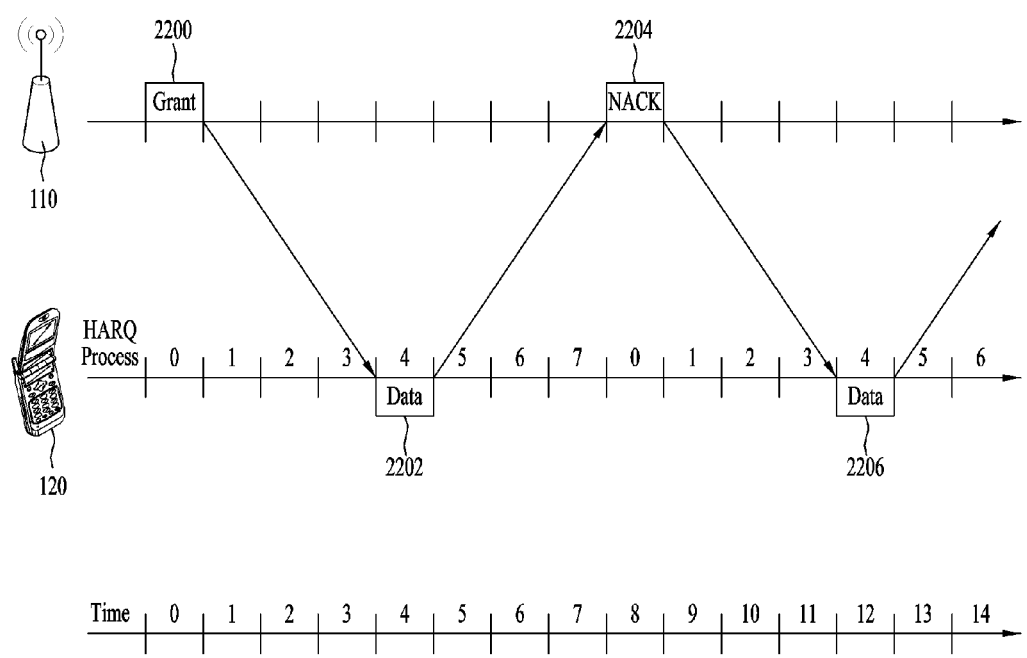
FIG. 16 is a diagram illustrating an exemplary UL hybrid automatic repeat request (HARQ) operation according to various embodiments of the present disclosure.

FIG. 16 is a diagram illustrating an exemplary UL HARQ operation according to various embodiments of the present disclosure.

There are a plurality of parallel HARQ processes for DL/UL transmission at a BS/UE. The plurality of parallel HARQ processes enable continuous DL/UL transmissions, while an HARQ feedback indicating successful or failed reception of a previous DL/UL transmission is awaited. Each HARQ process is associated with an HARQ buffer of the medium access control (MAC) layer. The HARQ process manages state parameters such as the number of transmissions of a MAC physical data block (PDU) in the buffer, an HARQ feedback for the MAC PDU in the buffer, and a current RV. When 8-channel HARQ is used, HARQ process IDs of 0 to 7 are given. As illustrated, HARQ process IDs are sequentially linked to time units (TUs) in synchronous HARQ. In asynchronous HARQ, an HARQ process ID is assigned by the network (e.g., the BS) during data scheduling. The term TU may be replaced with data transmission occasion (e.g., subframe or slot).

Referring to FIG. 16, a BS 110 transmits a UL grant on a PDCCH to a UE 120 (2200). The UE 120 transmits UL data on a PUSCH to the BS 110 (e.g., in TU k0) after k0 TUs from the reception time of the UL grant by using an RB and an MCS indicated by the UL grant (2202). The BS 110 decodes the UL data received from the UE 120. When the BS fails in decoding the UL data, the BS 110 transmits a NACK to the UE 120 (2204). In non-adaptive HARQ, the NACK may be transmitted on an ACK/NACK transmission channel (e.g., physical HARQ indicator channel (PHICH)), whereas in adaptive HARQ, the NACK may be indicated by an NDI in the UL grant. The UE 120 retransmits the UL data after k0' TUs from the reception time of the NACK (2206). The same HARQ process (e.g., HARQ process 4) is responsible for an initial transmission and a retransmission of the UL data. In synchronous HARQ, k0 and k0' are fixed (e.g., k=k0'=4). In contrast, k0 and k0' may be indicated by PDCCH-to-PUSCH timing indication information in the UL grant in synchronous HARQ.

3.2. Code Block Group (CBG)-Based HARQ Process

A transport block (TB)-based HARQ process is supported in LTE. In NR, a CBG-based HARQ process as well as the TB-based HARQ process is supported.

Figure 17:
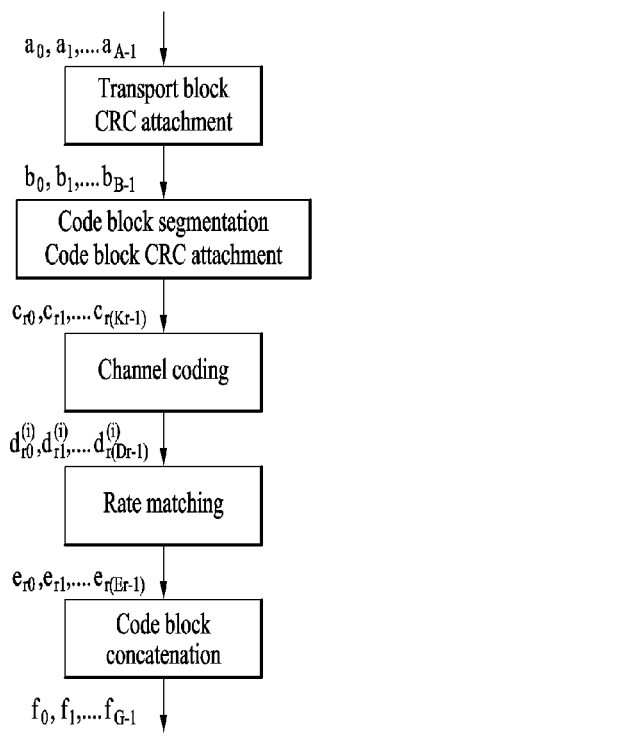
FIG. 17 is an exemplary diagram illustrating a transport block (TB) processing process and a TB structure according to various embodiments of the present disclosure.
Figure 17:
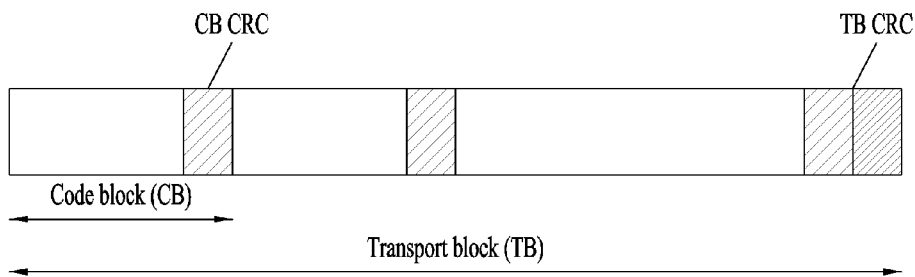

FIG. 17 is a diagram illustrating an example of a TB processing process and a TB structure according to various embodiments of the present disclosure.

The process of FIG. 17 may be applied to data on a transport channel such as a DL shared channel (DL-SCH), a paging channel (PCH), and a multicast channel (MCH). A UL TB (or data on a UL transport channel) may be processed in a similar manner.

Referring to FIG. 17, a transmitter adds a cyclic redundancy check (CRC) (TB CRC) (e.g., 24 bits) to a TB, for an error check. The transmitter may then divide the TB added with the CRC into a plurality of code blocks (CBs) in consideration of the size of a channel encoder. For example, the maximum size of a CB is 6144 bits in LTE. Therefore, when a TB size is equal to or less than 6144 bits, CBs are not configured, whereas when the TB size is greater than 6144 bits, the TB is divided into a plurality of CBs each including 6144 bits. Each individual CB is added with a CRC (CB CRC) (e.g., 24 bits), for an error check. The respective CBs are subjected to channel coding and rate matching and combined into a codeword. In the TB-based HARQ process, data scheduling and a related HARQ process are performed on a TB basis, and a CB CRC is used to determine early termination of TB decoding.

Figure 18:
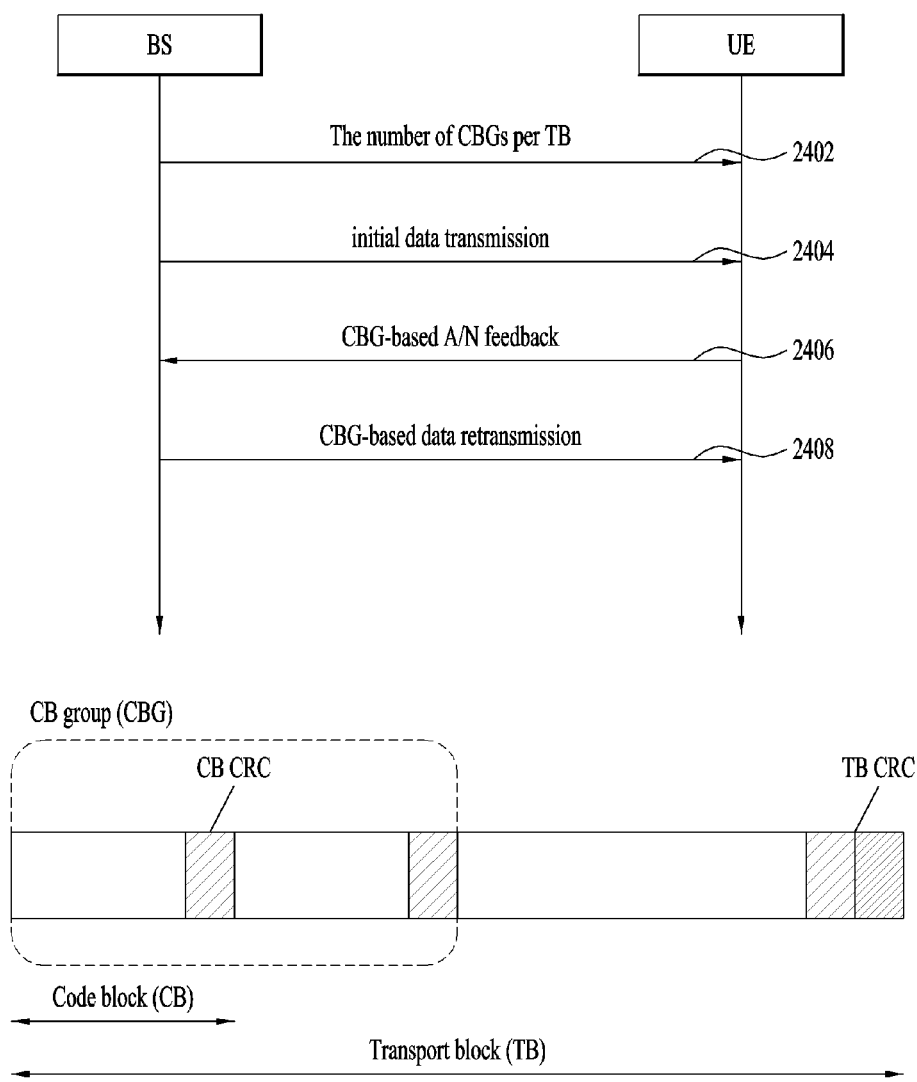
FIG. 18 is an exemplary diagram illustrating a code block group (CBG)-based HARQ process according to various embodiments of the present disclosure.

FIG. 18 is a diagram illustrating an exemplary CBG-based HARQ process according to various embodiments of the present disclosure.

In the CBG-based HARQ process, data scheduling and a related HARQ process may be performed on a $T_B$ basis.

Referring to FIG. 18, the UE may receive information about the number M of CBGs per TB from the BS by a higher-layer signal (e.g., RRC signal) (2402). The UE may then receive an initial transmission of data (on a PDSCH) from the BS (2404). The data may include a TB, the TB may include a plurality of CBs, and the plurality of CBs may be grouped into one or more CBGs. Each of some of the CBGs may include ceiling (K/M) CBs, and each of the other CBGs may include flooring (K/M) CBs. K represents the number of CBs included in the data. Subsequently, the UE may feed back CBG-based A/N information for the data to the BS (2406), and the BS may perform a data retransmission in a CBG-based manner (2408). The A/N information may be transmitted on a PUCCH or a PUSCH. The A/N information may include a plurality of A/N bits each representing one of A/N responses generated for the respective CBGs of the data. The payload size of the A/N information may be kept constant based on M irrespective of the number of CBGs included in the data.

3.3. Dynamic/Semi-Static HARQ-ACK Codebook Scheme

NR supports a dynamic HARQ-ACK codebook and a semi-static HARQ-ACK codebook. HARQ-ACK (or A/N) codebook may be replaced by HARQ-ACK payload.

In the dynamic HARQ-ACK codebook, the size of A/N payload varies depending on the number of actually scheduled DL data. For this purpose, a PDCCH related to DL scheduling includes a counter-downlink assignment index (counter-DAI) and a total-DAI. The counter-DAI represents a scheduled number {CC, slot} counted in a component carrier (CC)-first manner, for use in specifying the position of an A/N bit in the A/N codebook. The total-DAI represents the accumulative number of slot-based schedulings up to a current slot, for use in determining the size of the A/N codebook.

In the semi-static A/N codebook, the size of the A/N codebook is fixed (to a maximum value) irrespective of the number of actually scheduled DL data. Specifically, (a maximum) A/N payload (size) transmitted on one PUCCH in one slot may be determined to be the number of A/N bits corresponding to a combination (bundling window) of all CCs configured for the UE and all DL scheduled slots (or PDSCH transmission slots or PDCCH monitoring slots) for which an A/N transmission timing may be indicated. For example, DL grant DCI (PDCCH) may include PDSCH-to-A/N timing information, and the PDSCH-to-A/N timing information may have one (e.g., k) of a plurality of values. For example, when a PDSCH is received in slot #m and PDSCH-to-A/N timing information included in DL grant DCI (PDCCH) that schedules the PDSCH indicates k, A/N information for the PDSCH may be transmitted in slot #(m+k). For example, k∈{1, 2, 3, 4, 5, 6, 7, 8}. When the A/N information is transmitted in slot #n, the A/N information may include as many A/Ns as possible based on the bundling window.

4. Various Embodiments of the Present Disclosure

A detailed description will be given of various embodiments of the present disclosure based on the above technical ideas. The afore-described contents of clause 1 and clause 2 are applicable to various embodiments of the present disclosure described below. For example, operations, functions, terminologies, and so on which are not defined in various embodiments of the present disclosure may be performed and described based on clause 1 and clause 2.

Symbols/abbreviations/terms used in the description of various embodiments of the present disclosure may be defined as follows.

PDCCH: physical downlink control channel
PDSCH: physical downlink shared channel
PUSCH: physical uplink shared channel
CSI: channel state information RRM: radio resource management
DCI: downlink control information
CAP: channel access procedure
Ucell: unlicensed cell
TBS: transport block size
SLIV: starting and length indicator value (a field indicating the index of the starting symbol and the number of symbols in a slot of a PDSCH and/or a PUSCH. This field may be carried on a PDCCH scheduling the PDSCH and/or the PUSCH.)
BWP: bandwidth part (it may include contiguous RBs on the frequency axis and correspond to one numerology (e.g., an SCS, a CP length, a slot/mini-slot duration, or the like). Although multiple BWPs may be configured in one carrier (e.g., the number of BWPs per carrier may also be limited), the number of active BWPs may be limited to a value less than the number (e.g., 1) of the multiple BWPs in the carrier.
CORESET: control resource set (a time and frequency resource area in which a PDCCH may be transmitted. The number of CORESETs per BWP may be limited.)
REG: resource element group another communication node is transmitting a signal is defined as carrier sensing (CS), and determining that another communication node is not transmitting a signal is defined as confirming clear channel assessment (CCA).

In an LTE/NR system to which various embodiments of the present disclosure are applicable, an eNB/gNB or a UE may also have to perform an LBT operation or a CAP for signal transmission in an unlicensed band. In other words, the eNB/gNB or the UE may transmit a signal in the unlicensed band, using or based on the CAP.

Further, when the eNB/gNB or the UE transmits a signal in the unlicensed band, other communication nodes such as WiFi nodes should not interfere with the eNB/gNB or the UE by performing a CAP. For example, the WiFi standard (e.g., 801.11ac) specifies a CCA threshold as −62 dBm for a non-WiFi signal and as −82 dBm for a WiFi signal. Accordingly, a station (STA) or access point (AP) operating in conformance to the WiFi standard may not transmit a signal to prevent interference, for example, when receiving a signal other than a WiFi signal at or above −62 dBm.

For example, CAP (LBT) may be categorized as described in the following Table 15.

TABLE 15

Category 1: Immediate transmission after a short switching gap
This is used for a transmitter to immediately transmit after a switching gap inside a COT.
The switching gap from reception to transmission is to accommodate the transceiver turnaround time and is no longer than 16 μs.
Category 2: LBT without random back-off.
The duration of time that the channel is sensed to be idle before the transmitting entity transmits is deterministic.
Category 3: LBT with random back-off with a contention window of fixed size
The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.
Category 4: LBT with random back-off with a contention window of variable size
The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

SFI: slot format indicator (an indicator indicating a symbol-level DL/UL direction in specific slot(s), which may be transmitted on a GC-PDCCH.)
COT: channel occupancy time
SPS: semi-persistent scheduling As more and more communication devices require larger communication capacities, efficient use of a limited frequency band becomes a significant requirement. In this context, techniques of using an unlicensed band such as 2.4 GHz mainly used in the legacy WiFi system or 5 GHz and/or 60 GHz which has newly attracted attention are under consideration for a cellular communication system such as 3GPP LTE/NR. Hereinbelow, the term unlicensed band may be replaced with unlicensed spectrum or shared spectrum.

To transmit a signal in an unlicensed band, a UE or a BS uses wireless transmission and reception based on contention between communication nodes. That is, when each communication node is to transmit a signal in the unlicensed band, the communication node may confirm that another communication node is not transmitting a signal in the unlicensed band by performing channel sensing before the signal transmission. For the convenience of description, this operation is defined as a listen before talk (LBT) operation or a CAP. Particularly, the operation of checking whether In an NR system operating in an unlicensed band, a node may reduce the probability of collision with other nodes co-existent (in the unlicensed band) by adjusting a CWS. One of big differences between an NR system operating in an unlicensed band and an LTE system operating in an unlicensed band lies in that an HARQ-ACK feedback for a PDSCH may be delivered in the unlicensed band in the former.

In the LTE system operating in the unlicensed band, for example, transmission/reception of a PUCCH in the unlicensed band is not considered. Accordingly, when failing in receiving an HARQ-ACK feedback, the BS adjusts a DL CWS in consideration of discontinuous transmission (DTX). For example, the UE adjusts a UL CWS depending on whether an NDI has been toggled by the BS. That is, only DL/UL CWS adjustment with no regard to failure of HARQ-ACK feedback transmission/reception caused by CAP failure or the like is considered.

In contrast, various embodiments of the present disclosure are intended to propose methods of adjusting DL and UL CWSs according to successful and failed transmission/reception of a UL HARQ-ACK feedback in consideration of possible transmission/reception of an HARQ-ACK feedback on a channel (e.g., PUCCH/PUSCH) in an unlicensed band in an NR system operating in the unlicensed band. According to various embodiments of the present disclosure, whether an HARQ-ACK feedback for a transmission has been successfully transmitted or failed is reflected in a CAP, and the resulting decrease of the collision probability of the transmission may lead to an increased transmission success rate.

The following description is given of various embodiments of the present disclosure with the appreciation that when a BS succeeds in a CAP, this means that the BS starts a signal transmission in an unlicensed band at a given time, determining the unlicensed band to be idle. On the contrary, when the BS fails in the CAP, this may imply that the BS does not start the signal transmission in the unlicensed band at the given time, determining the unlicensed band to be busy.

Figure 19:
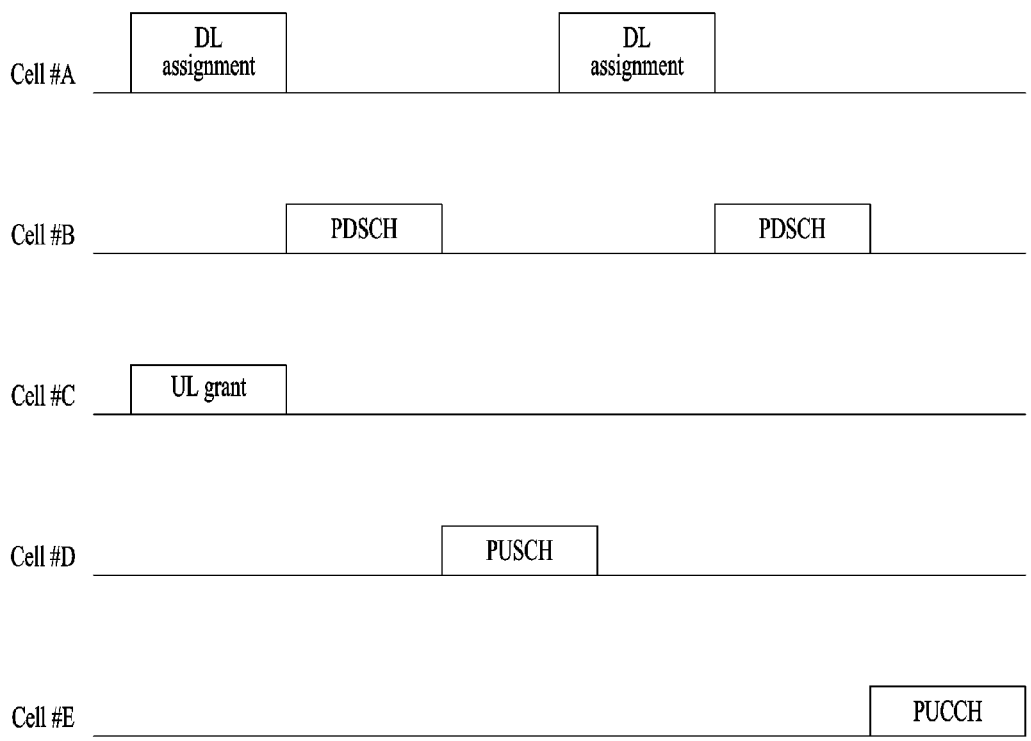
FIG. 19 is a diagram illustrating exemplary signal transmission and reception according to various embodiments of the present disclosure.

FIG. 19 is a diagram illustrating exemplary signal transmission and reception according to various embodiments of the present disclosure.

Referring to FIG. 19, an HARQ-ACK feedback for a PDSCH reception in cell #B scheduled through cell #A may be piggybacked to a PUSCH in cell #D scheduled through cell #C and/or transmitted on a PUCCH in cell #E.

While signal transmission and reception are shown in FIG. 19 as performed in five cells by way of example, all or some of the cells may be regarded as one cell. For example, all of the five cells may serve as PCells, as NR cells in the unlicensed band. For example, in the case of self-carrier scheduling, cell #A and cell #B (and/or cell #C and/or cell #D) may be identical. Further, various embodiments of the present disclosure may be applied to signal transmission and reception in five or more cells/five or fewer cells.

Now, a detailed description will be given of methods of adjusting UL and DL CWSs, when HARQ-ACK information is fed back on a PUSCH and/or a PUCCH in the exemplary signal transmission/reception deployment illustrated in FIG. 19 according to various embodiments of the present disclosure.

4.1. Receiver (Entity A)

Figure 20:
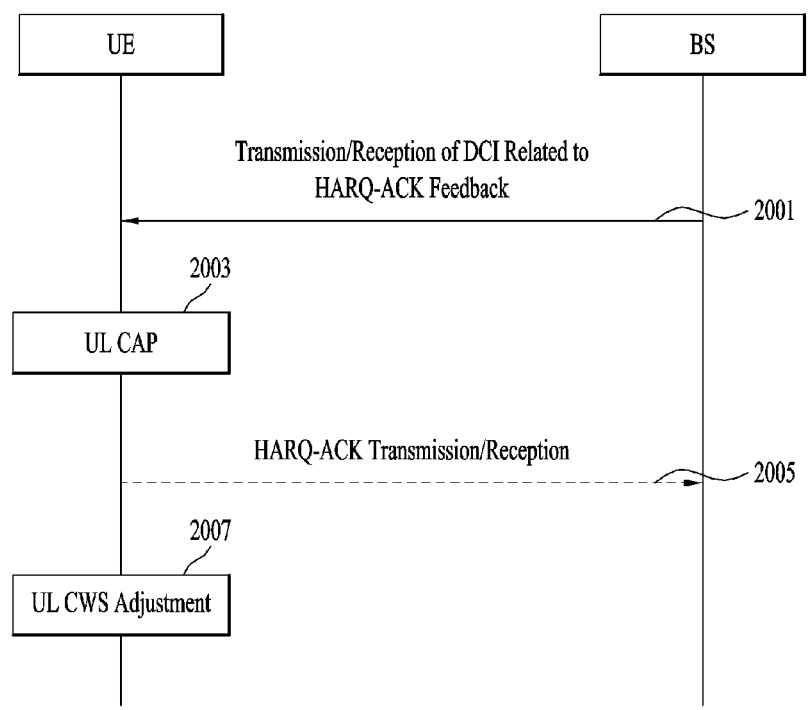
FIG. 20 is a diagram illustrating a signal flow for an exemplary method of adjusting a UL contention window size (CWS) according to various embodiments of the present disclosure.

FIG. 20 is a diagram illustrating a signal flow for an exemplary method of adjusting a UL CWS according to various embodiments of the present disclosure.

Referring to FIG. 20, the UE may receive DCI related to an HARQ-ACK feedback from the BS in operation 2001 according to an exemplary embodiment. For example, the DCI may be DL assignment DCI and/or separate DCI (e.g., separate DCI may mean DCI triggering only an HARQ-ACK feedback in this subclause and the description of various embodiments of the present disclosure) and/or a UL grant that schedules a PUSCH. For example, the DCI may be received in a licensed band and/or an unlicensed band. For example, when the BS transmits the DCI in the unlicensed band, the BS may perform a DL CAP to transmit the DCI.

In operations 2003 and 2005 according to an exemplary embodiment, the UE may transmit an HARQ-ACK in the unlicensed band to the BS based on a UL CAP for the transmission of the HARQ-ACK related to the received DCI. For example, the BS may succeed/fail in receiving (and/or obtaining) the HARQ-ACK.

In operation 2007 according to an exemplary embodiment, the UE may adjust a UL CWS (e.g., reset and/or maintain and/or increase the UL CWS to a next value) based on successful/failed reception of the HARQ-ACK at the BS. For example, the UE may receive (and/or obtain) a specific signal (related to the successful/failed reception of the HARQ-ACK at the BS) from the BS and adjust the UL CWS based on the specific signal.

For example, when the UE attempts to transmit a UL signal in the unlicensed band, the UE may transmit the UL signal based on a UL CAP to which the adjusted UL CWS is applied.

Exemplary operations according to various embodiments of the present disclosure will be described below in detail.

In the description of various embodiments of the present disclosure, a case in which "the UE considers that the BS has successfully received an HARQ-ACK" may include at least one of the following conditions. For example, based on at least one of the following conditions being satisfied, the UE may determine that the BS has successfully received an HARQ-ACK.

As an NDI is toggled in a DL assignment corresponding to the ID of an HARQ process for which ACK has been transmitted as HARQ-ACK information, a new transmission is requested.

An NDI is not toggled in a DL assignment corresponding to the ID of an HARQ process for which NACK (or DTX) has been transmitted as HARQ-ACK information, and thus a retransmission is requested.

In the case where the BS may indicate an HARQ-ACK feedback for each specific HARQ process index group, when the HARQ-ACK feedback timing of the UE is slot #n and then the HARQ-ACK request timing of the BS is slot #n+k, the UE does not receive an HARQ-ACK request corresponding to (all or some of) the indexes of HARQ processes in which there is no additional PDSCH reception in the intermediate slots (slots between slot #n and slot #n+k), among HARQ process index groups included in an HARQ-ACK feedback in slot #n. For example, a group ID may be assigned to each PDSCH, and the UE may receive an indication (request) of an HARQ-ACK feedback corresponding to one of the assigned group IDs. For example, the UE transmits an HARQ-ACK feedback corresponding to the indicated (requested) group ID (e.g., group 1). Then, when the UE does not receive an indication (request) of an HARQ-ACK feedback corresponding to the same group, group 1 within a predetermined time period, the UE may consider that the BS has successfully received the HARQ-ACK.

In the case where the BS may indicate an HARQ-ACK feedback included in a specific time window, when the HARQ-ACK feedback timing of the UE is slot #n and then the HARQ-ACK request timing of the BS is slot #n+k, a time window A associated with an HARQ-ACK feedback transmitted in slot #n does not overlap with a time window associated with an HARQ-ACK feedback indicated in slot #n+k or the time window A associated with the HARQ-ACK feedback transmitted in slot #n is followed by the time window associated with the HARQ-ACK feedback indicated in slot #n+k, and/or in the case where the BS may indicate an HARQ-ACK feedback included in a specific time window, when the HARQ-ACK feedback timing of the UE is slot #n and the HARQ-ACK request timing of the BS is slot #n+k, the time window A associated with the HARQ-ACK feedback transmitted in slot #n is followed by the time window associated with the HARQ-ACK feedback indicated in slot #n+k and/or there is no overlap between the time window A and the time window B.

When the BS may indicate and/or request an HARQ-ACK feedback for each PDSCH group, upon request of an HARQ-ACK feedback for a specific group, the UE transmits the HARQ-ACK feedback for the group in slot #n, and a DCI field (e.g., which may be a new feedback indicator (NFI), indicating whether previously transmitted HARQ-ACK information is allowed to be flushed) corresponding to the group in subsequently received DCI is toggled.

In the description of various embodiments of the present disclosure, when it is said that "the UE considers that the BS has successfully received an HARQ-ACK", this may be understood as meaning that "the UE has successfully transmitted an HARQ-ACK to the BS from the perspective of the UE (or the UE determines that the UE has successfully transmitted an HARQ-ACK to the BS)".

In the description of various embodiments of the present disclosure, a case in which "the UE considers that the BS has failed in receiving an HARQ-ACK" may include at least one of the following conditions. For example, based on at least one of the following conditions being satisfied, the UE may determine that the BS has failed in receiving an HARQ-ACK. And/or when a situation is not included in the case in which "the UE considers that the BS has successfully received an HARQ-ACK", the situation may be regarded as a case in which "the UE considers that the BS has failed in receiving an HARQ-ACK".

- An NDI is not toggled in a DL assignment corresponding to the ID of an HARQ process for which ACK is transmitted as HARQ-ACK information, and thus a retransmission is requested.
- As an NDI is toggled in a DL assignment corresponding to the ID of an HARQ process for which NACK (or DTX) is transmitted as HARQ-ACK information, a new transmission is requested.
- In the case where the BS may indicate an HARQ-ACK feedback for each specific HARQ process index group, when the HARQ-ACK feedback timing of the UE is slot #n and then the HARQ-ACK request timing of the BS is slot #n+k, the UE receives an HARQ-ACK request corresponding to (all or some of) the indexes of HARQ processes with no additional PDSCH reception in the intermediate slots (slots between slot #n and slot #n+k), among HARQ process index groups included in an HARQ-ACK feedback in slot #n. For example, a group ID may be assigned to each PDSCH, and the UE may receive an indication (request) of an HARQ-ACK feedback corresponding to one of the assigned group IDs. For example, the UE transmits an HARQ-ACK feedback corresponding to the indicated (requested) group ID (e.g., group 1). Then, when the UE receives an indication (request) of an HARQ-ACK feedback corresponding to the same group, group 1 within a predetermined time period, the UE may consider that the BS has failed in receiving the HARQ-ACK.
- In the case where the BS may indicate an HARQ-ACK feedback included in a specific time window, when the HARQ-ACK feedback timing of the UE is slot #n and then the HARQ-ACK request timing of the BS is slot #n+k, a time window A associated with an HARQ-ACK feedback transmitted in slot #n overlaps with a time window associated with an HARQ-ACK feedback indicated in slot #n+k.
- When the BS may indicate and/or request an HARQ-ACK feedback for each PDSCH group, upon request of an HARQ-ACK feedback for a specific group, the UE transmits the HARQ-ACK feedback for the group in slot #n, and a DCI field (e.g., which may be an NFI, indicating whether previously transmitted HARQ-ACK information is allowed to be flushed) corresponding to the group in subsequently received DCI is not toggled.

In the description of various embodiments of the present disclosure, when it is said that "the UE considers that the BS has failed in receiving an HARQ-ACK", this may be understood as meaning that "the UE has not successfully transmitted an HARQ-ACK to the BS (or the UE determines that the UE has not successfully transmitted an HARQ-ACK to the BS)".

4.1.1. [CASE A] "Case in which the UE Considers that the BS has Successfully Received an HARQ-ACK"

4.1.1.1. [Method #1-1]

According to various embodiments of the present disclosure, a UL CWS may be reset for every priority class corresponding to a cell in which a PUSCH and/or PUCCH including the HARQ-ACK transmission has been transmitted. This may be because the HARQ-ACK transmission is successful.

This method according to various embodiments of the present disclosure may be applied, for example, only when the PUSCH and/or PUCCH including the HARQ-ACK transmission has been transmitted in a UL reference slot. According to various embodiments of the present disclosure, the definition of the UL reference slot may be given, for example, in [UL reference slot method] to be described later. According to various embodiments of the present disclosure, when the PUCCH and/or PUCCH has not been transmitted in the UL reference slot, the UL CWS may be maintained.

4.1.1.2. [Method #1-2]

According to various embodiments of the present disclosure, the UL CWS may be maintained for every priority class corresponding to the cell in which the PUSCH and/or PUCCH including the HARQ-ACK transmission has been transmitted. This may be because the HARQ-ACK feedback information has been used for DL CWS adjustment and thus it is not preferable to adjust both of the DL CWS and the UL CWS with one transmission (i.e., one piece of HARQ-ACK feedback information).

4.1.2. [CASE B] "Case in which the UE Considers that the BS has Failed in Receiving an HARQ-ACK"

4.1.2.1. [Method #2-1]

According to various embodiments of the present disclosure, the UL CWS may be increased to a next value for every priority class corresponding to the cell in which the PUSCH and/or PUCCH including the HARQ-ACK transmission has been transmitted. This may be because the HARQ-ACK transmission has collided with another transmitting node and thus has been failed.

This method according to various embodiments of the present disclosure may be applied, for example, only when the PUSCH and/or PUCCH including the HARQ-ACK transmission has been transmitted in the UL reference slot. According to various embodiments of the present disclosure, the definition of the UL reference slot may be given, for example, in [UL reference slot method] to be described later. According to various embodiments of the present disclosure, when the PUCCH and/or PUCCH has not been transmitted in the UL reference slot, the UL CWS may be maintained.

4.1.2.2. [Method #2-2]

According to various embodiments of the present disclosure, the UL CWS may be maintained for every priority class corresponding to the cell in which the PUSCH and/or PUCCH including the HARQ-ACK transmission has been transmitted. This may be because the HARQ-ACK feedback information has been used for DL CWS adjustment and thus it is not preferable to adjust both of the DL CWS and the UL CWS with one transmission (i.e., one piece of HARQ-ACK feedback information).

4.1.3. [UL Reference Slot Method]

For example, in Rel-14 enhanced licensed assisted access (eLLA), a reference subframe for UL CWS adjustment may be defined as the first subframe of a UL transmission burst that starts 3 ms before the UE receives a UL grant.

According to various embodiments of the present disclosure, when a UE configured with an HARQ-ACK transmission in an unlicensed carrier and/or channel transmits an HARQ-ACK feedback on a PUCCH and/or PUSCH during the time period of the first slot(s) of a UL transmission burst that starts T slot(s) (T may be configured by higher-layer signaling and/or L1 signaling) before the UE receives a DL assignment and/or during the time period of a part of the first slot(s), the time period may be defined as a reference slot (or reference duration) for UL CWS adjustment.

4.1.4. [Priority Class Method]

According to various embodiments of the present disclosure, in the case of a PUCCH only transmission, the UE may apply a Category 4 CAP (see Table 16) and, upon success of the CAP, attempt the PUCCH transmission.

For example, a different priority class may be defined for each UCI type carried on the PUCCH.

For example, in the case of a PUCCH transmission carrying only HARQ-ACK information (or including HARQ-ACK information), the Category 4 CAP may be performed by including (or based on) a CAP (LBT) parameter corresponding to priority class 1.

For example, in the case of a PUCCH transmission carrying only channel state information (CSI) (or including CSI), the Category 4 CAP may be performed by including (or based on) a CAP (LBT) parameter corresponding to priority class 2.

In another example, a different CWS (and/or a different CWS set) may be defined for each UCI type carried on the PUCCH.

For example, smaller CWS values may be applied to the Category 4 CAP in a PUCCH transmission carrying only HARQ-ACK information (or including HARQ-ACK information) than in a PUCCH transmission carrying only CSI (or including CSI).

In another example, a different energy detection threshold may be defined for each UCI type carried on the PUCCH.

For example, larger energy detection thresholds may be applied to the Category 4 CAP in a PUCCH transmission carrying only HARQ-ACK information (or including HARQ-ACK information) than in a PUCCH transmission carrying only CSI (or including CSI).

4.1.5. [PUCCH and/or PUCCH carrying only CSI without HARQ-ACK information]

According to various embodiments of the present disclosure, for example, a CWS may be maintained for a PUCCH carrying only CSI without HARQ-ACK information (e.g., a periodic/semi-static PUCCH including CSI) and/or a PUSCH carrying only CSI without HARQ-ACK information PUSCH (e.g., a CSI only PUSCH without a UL-SCH or a semi-persistent PUSCH including CSI), even though a random-backoff-based CAP (or Category 4 CAP) is performed before the UL transmission.

4.2. Transmitter (Entity B)

Figure 21:
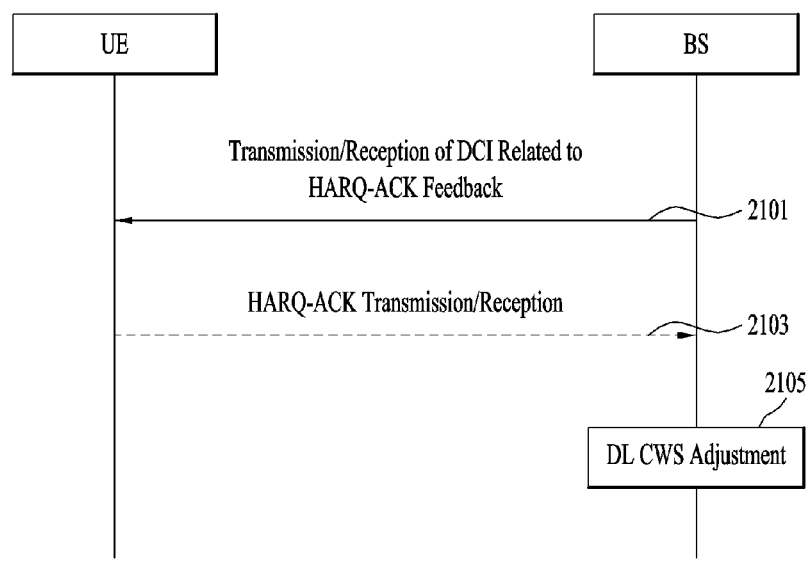
FIG. 21 is a diagram illustrating a signal flow for an exemplary method of adjusting a DL CWS according to various embodiments of the present disclosure.

FIG. 21 is a diagram illustrating a signal flow for an exemplary method of adjusting a DL CWS according to various embodiments of the present disclosure.

Referring to FIG. 21, in operation 2101 according to an exemplary embodiment, a BS may transmit DCI related to an HARQ-ACK feedback to a UE. For example, the DCI may be DL assignment DCI and/or separate DCI and/or a UL grant that schedules a PUSCH. For example, the DCI may be received in a licensed band and/or an unlicensed band. For example, when the BS transmits the DCI in the unlicensed band, the BS may perform a DL CAP for the DCI transmission.

In operation 2103 according to an exemplary embodiment, the BS may successfully receive (and/or obtain) an HARQ-ACK related to the DCI or may not successfully receive (and/or obtain) the HARQ-ACK related to the DCI in various situations described below.

In operation 2105 according to an exemplary embodiment, the BS may adjust a DL CWS (e.g., reset and/or maintain and/or increase the DL CWS to a next value) depending on whether the BS has received the HARQ-ACK.

For example, when the BS attempts to transmit a DL signal in the unlicensed band, the BS may transmit the DL signal based on a DL CAP to which the adjusted DL CWS is applied.

Now, a detailed description will be given of exemplary operations according to various embodiments of the present disclosure.

4.2.1. [CASE 1] Case in which the BS has Successfully Received HARQ-ACK Information In LTE-license assisted access (LTE-LAA), for example, a reference subframe for DL CWS adjustment may be defined as the first subframe of a latest transmission burst available for an HARQ-ACK feedback on a channel configured by the BS.

According to various embodiments of the present disclosure, the DL CWS may be adjusted based on HARQ-ACK information for the DL reference slot.

For example, the DL reference slot may be the first slot(s) of a latest DL transmission of the BS and/or the time area of a part of the first slot(s).

For example, when the NACK ratio of HARQ-ACK information corresponding to a PDSCH in the DL reference slot is X % or more (e.g., X=80), the DL CWS may be increased to a next value for every priority class. Otherwise, the DL CWS may be reset for every priority class.

4.2.2. [CASE 2] Case in which the BS has Failed in Receiving HARQ-ACK Information

4.2.2.1. [CASE 2-1] Case in which it is Considered that the UE Transmitted HARQ-ACK Information but the BS has Failed in Receiving the HARQ-ACK Information

4.2.2.1.1. [Method #3-1]

According to various embodiments of the present disclosure, the HARQ-ACK information may be considered as (ALL) NACK.

For example, all PDSCHs corresponding to the HARQ-ACK information are considered as NACK, which may affect DL CWS adjustment for a cell in which each PDSCH has been transmitted.

For example, this method according to various embodiments of the present disclosure may be applied, only when the DM-RS of a PUCCH and/or PUSCH including the HARQ-ACK information has been detected but HARQ-ACK decoding has been failed (e.g. due to a CRC error).

In another example, the method according to various embodiments of the present disclosure may be applied, only when other data (e.g., a UL-SCH or separately coded CSI) multiplexed with the HARQ-ACK in the PUCCH and/or PUSCH including the HARQ-ACK information has been successfully decoded but HARQ-ACK decoding has been failed (e.g., due to a CRC error).

In another example, the method according to various embodiments of the present disclosure may be applied, only when the number of HARQ-ACK payload bits is equal to or greater than a specific value and/or the number of DCIs requesting the HARQ-ACK transmission is equal to or greater than a specific number. This may be because when the number of DCIs is equal to or greater than a specific number, the probability of DCI missing at the UE may be low. That is, since the UE is highly probable to receive DCI, the UE may transmit HARQ-ACK information requested by the DCI with a higher probability.

In the description of various embodiments of the present disclosure, DCI missing may mean, for example, unsuccessful reception of DCI at the UE and/or failed reception of DCI at the UE. For example, DCI missing may include failed decoding of DCI due to a CRC error at the UE.

In another example, this method according to various embodiments of the present disclosure may be applied, only when the time-axis occupancy period of the PUSCH and/or PUCCH is less than or equal to a predetermined time, and/or when the number of PUSCH and/or PUCCH transmission occasions is less than or equal to a predetermined number.

In another example, the method according to various embodiments of the present disclosure may be applied only to a sequence only PUCCH without a DM-RS (e.g., PUCCH format 0 in Rel-15 NR).

4.2.2.1.2. [Method #3-2]

According to various embodiments of the present disclosure, all of the HARQ-ACK information may be processed as IGNORE.

For example, the HARQ-ACK information may not affect DL CWS adjustment for cell(s) in which DCI requesting the HARQ-ACK feedback has been transmitted and/or cell (s) in which the corresponding PDSCH has been transmitted. For example, this may be because it is preferable to affect UL CWS adjustment of the UE, on the assumption of collision with another transmission (e.g., collision between the HARQ-ACK transmitted by the UE and a transmission from another transmission node).

For example, in the description of various embodiments of the present disclosure, "DCI requesting an HARQ-ACK feedback" may be DL assignment DCI and/or separate DCI and/or a UL grant that schedules a PUSCH.

For example, the method according to various embodiments of the present disclosure may be applied, only when the DM-RS of the PUCCH and/or PUSCH including the HARQ-ACK information has not been detected.

In another example, the method according to various embodiments of the present disclosure may be applied only when the number of HARQ-ACK payload bits is equal to or greater than a specific value and/or the number of DCIs requesting an HARQ-ACK transmission is equal to or greater than a specific number. This may be because when the number of the DCIs is equal to or greater than a specific number, the probability of DCI missing at the UE may be low. That is, since the UE is highly probable to receive DCI, the UE may transmit HARQ-ACK information requested by the DCI with a higher probability.

In another example, this method according to various embodiments of the present disclosure may be applied, only when the time-axis occupancy period of the PUSCH and/or PUCCH is greater than a predetermined time, and/or when the number of PUSCH and/or PUCCH transmission occasions is greater than a predetermined number.

In another example, the method according to various embodiments of the present disclosure may be applied only to a sequence only PUCCH without a DM-RS (e.g., PUCCH format 0 in Rel-15 NR).

4.2.2.2. [CASE 2-2] Case in which it is Considered that the UE has Missed DCI Requesting HARQ-ACK Information and Thus has not Transmitted the HARQ-ACK Information

4.2.2.2.1. [Method #4-1]

According to various embodiments of the present disclosure, DL CWS adjustment for cell(s) carrying the DCI requesting the HARQ-ACK feedback may be affected.

For example, all DCI transmissions in cell(s) requesting the HARQ-ACK feedback may be considered to be NACK, thereby affecting DL CWS adjustment for each cell.

For example, all of (HARQ-ACK information for) PDSCHs corresponding to an HARQ process index included in the HARQ-ACK information requested by the DCI may be considered to be NACK.

For example, the method according to various embodiments of the present disclosure may be applied, only when the number of HARQ-ACK payload bits is less than a specific value and/or the number of DCIs requesting an HARQ-ACK transmission is less than a specific number. This may be because when the number of DCIs is equal to or greater than a specific number, the probability that the UE misses DCI is relatively high. That is, since the possibility that the UE has not received DCI is relatively high, the probability that the UE has not transmitted the HARQ-ACK information requested by the DCI is relatively high.

For example, method #4-1 according to various embodiments of the present disclosure may be applied, only when cell(s) carrying the DCI requesting the HARQ-ACK feedback is a cell configured in the unlicensed band.

4.2.2.3. [CASE 2-3] Case in which it is Considered that the UE has Intended to Transmit HARQ-ACK Information but has not Transmitted the HARQ-ACK Information Due to CAP Failure

4.2.2.3.1. [Method #5-1]

According to various embodiments of the present disclosure, all of the HARQ-ACK information may be processed as IGNORE.

For example, the HARQ-ACK information may not affect DL CWS adjustment for the cell(s) carrying the DCI requesting the HARQ-ACK feedback and/or the cell(s) carrying the corresponding PDSCH.

For example, the method according to various embodiments of the present disclosure may be applied, only when the number of PUSCH and/or PUCCH transmission occasions is less than or equal to a predetermined number.

4.2.3. [Block A/N Method]

For example, in the NR system operating in the unlicensed band, the BS may request an HARQ-ACK feedback at a desired specific time while pending the HARQ-ACK feedback, and indicate an HARQ-ACK feedback included in a specific time window. In this case, the time difference between an actual transmission time of a PDSCH and a reception time of an HARQ-ACK feedback for the PDSCH may be significantly increased.

In this regard, as the time difference increases, a weight may be given to the HARQ-ACK information according to various embodiments of the present disclosure.

For example, a relatively high (or low) weight may be assigned to HARQ-ACK information having a relatively large difference between an HARQ-ACK feedback reception time and a corresponding PDSCH transmission time.

For example, a relatively low (or high) weight may be assigned to HARQ-ACK information having a relatively small difference between an HARQ-ACK feedback reception time and a corresponding PDSCH transmission time.

4.2.4. [COT sharing Method]

For example, in Rel-14 eLAA, in the case where the BS attempts a DL transmission including a UL grant without a PDSCH in an LAA SCell, when less than 10% of corresponding UL transport blocks are successfully received, the CWS may be increased.

For example, this method may be applied, only when the UE attempts a UL transmission using a Category 2 CAP within the channel occupancy of the BS.

According to various embodiments of the present disclosure, even when a PRACH is triggered by a PDCCH order or DCI and/or when a PUCCH transmission is indicated by DCI and/or a message 3 PUSCH transmission is indicated by an RAR and/or an SRS transmission is indicated by DCI or higher-layer signaling, the corresponding rule or method may also be applied.

For example, in the case where the BS transmits a DL signal with DCI only without a PDSCH (during a time period spanning X or fewer symbols) within the channel occupancy time (COT) of the BS and shares the COT with a UL transmission, when a reception success ratio of the total number of signals/channels included in the UL transmission is less than a specific value, the DL CWS may be increased. Further, when a reception success ratio of each individual signal/channel among the total number of signals/channels included in the UL transmission is less than a specific value, the DL CWS value may be increased.

For example, the UL transmission may include a UL $T_B$ and/or a PRACH and/or a PUCCH and/or a message3 PUSCH and/or an SRS.

For example, when less than Y % of the total number of UL TBs and/or PRACHs and/or PUCCHs and/or message 3 PUSCHs and/or SRSs triggered by a DL signal in the COT are successfully received, the CWS value may be increased.

In another example, when less than Z1% of the total number of UL TBs triggered by the DL signal in the COT and/or less than Z2% of the total number of PRACHs triggered by the DL signal in the COT and/or less than Z3% of the total number of PUCCHs triggered by the DL signal in the COT and/or less than Z4% of the total number of message 3 PUSCHs triggered by the DL signal in the COT and/or less than Z5% of the total number of SRSs triggered by the DL signal in the COT are successfully received, the CWS may be increased. For example, Z1 to Z4 may be different values and/or at least some of Z1 to Z4 may be equal.

4.3. Receiver & Transmitter (Between Receiver and Transmitter)

Figure 22:
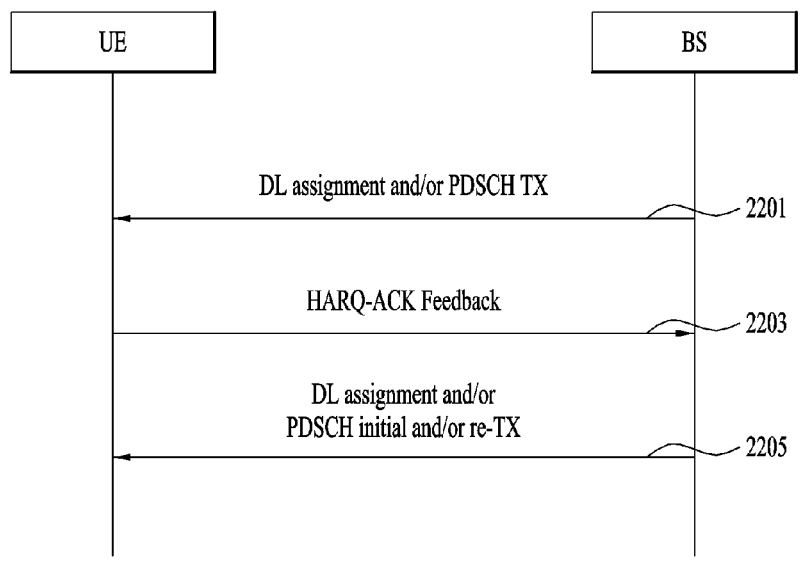
FIG. 22 is a diagram illustrating a signal flow for an exemplary method of adjusting a CWS according to various embodiments of the present disclosure.

FIG. 22 is a diagram illustrating a signal flow for an exemplary method of adjusting a CWS according to various embodiments of the present disclosure.

Referring to FIG. 22, the BS may indicate a DL assignment and/or indicate a PDSCH transmission by a DL assignment in operation 2201 according to an exemplary embodiment.

In operation 2203 according to an exemplary embodiment, the UE may receive the PDSCH and feed back information indicating whether the reception is successful or failed, that is, HARQ-ACK information on a PUCCH and/or a PUSCH (in an unlicensed band) to the BS.

In operation 2205 according to an exemplary embodiment, the BS may determine the next transmission based on the HARQ-ACK information. For example, when the HARQ-ACK information is ACK, the BS may schedule a new PDSCH for the UE. For example, when the HARQ-ACK information is NACK, the BS may perform a PDSCH retransmission.

For example, when the HARQ-ACK information fed back by the UE does not match the initial transmission and/or the retransmission, the UE may increase a CWS for a CAP for the next HARQ-ACK feedback, considering that collision has occurred to the HARQ-ACK transmission.

Now, a detailed description will be given of exemplary operations according to various embodiments of the present disclosure.

According to various embodiments of the present disclosure, the BS and/or the UE may adjust a CWS basically in each of one or more combinations of CASE A/B and/or CASE ½ described above.

Referring back to FIG. 19, a different method may be applied to each scenario depending on a CAP method for a PUSCH and/or PUCCH transmission of a UE and/or a relationship between cells illustrated in FIG. 19. Various embodiments of the present disclosure according to an embodiment for each scenario will be described below.

In the following description of each scenario, in the wording "after a Category X CAP", the Category X CAP (e.g., X=1, 2, 3, 4) may be a CAP category configured/indicated by DCI and/or higher-layer signalling and/or a CAP category performed shortly before the UE performs a PUSCH and/or PUCCH transmission. For example, the CAP category may be based on the definition described in Table 16.

4.3.1. [SCENARIO 1] PUSCH and/or PUCCH Transmission after Category 1 CAP

In CASE 2, for example, the UE does not perform a CAP. Therefore, the DL CWP method of the BS may be applied on the assumption of only CASE 2-1 and/or CASE 2-2. For example, the UE may not perform UL CWS adjustment for the PUSCH and/or PUCCH transmission.

4.3.2. [SCENARIO 2] PUSCH and/or PUCCH Transmission after Category 2 CAP

In CASE 2, for example, the UE performs a CAP unlike SCENARIO 1. Therefore, the DL CWP method of the BS may be applied on the assumption of CASE 2-1 and/or CASE 2-2 and/or CASE 2-3. For example, the UE may not perform UL CWS adjustment for the PUSCH and/or PUCCH transmission.

4.3.3. [SCENARIO 3] PUSCH and/or PUCCH Transmission after Category 4 CAP

4.3.3.1. [SCENARIO 3-1]

For example, when HARQ-ACK information is transmitted on a PUCCH, and a cell carrying a DL assignment is identical to a cell carrying the PUCCH and/or when HARQ-ACK information is transmitted on a PUSCH, and a cell carrying a UL grant is identical to a cell carrying a PUCCH, the following operation may be performed.

In the case where the BS fails in receiving a PUSCH and/or a PUCCH (or both of the PUSCH and the PUCCH) (in relation to HARQ-ACK information) as in CASE 2, when DCI missing is assumed as in CASE 2-2, method #1-2 may be applied in CASE A and/or method #2-2 may be applied in CASE B from the perspective of the UE. This may be, for example, because DCI missing has already been reflected in DL CWS adjustment.

For example, when the BS successfully receives the PUSCH and/or the PUCCH (in relation to HARQ-ACK information), CASE 1 may be applied.

That is, in this example, when the UE considers that the BS has successfully received an HARQ-ACK, the UE may maintain a UL CWS for every priority class corresponding to a cell carrying a PUSCH and/or PUCCH including the HARQ-ACK transmission.

Alternatively in this example, when the UE considers that the BS has failed in receiving the HARQ-ACK, the UE may maintain the UL CWS for every priority class corresponding to the cell carrying the PUSCH and/or PUCCH including the HARQ-ACK transmission.

4.3.3.2. [SCENARIO 3-2]

For example, when HARQ-ACK information is transmitted on a PUCCH, and a cell carrying a DL assignment is different from a cell carrying the PUCCH and/or when HARQ-ACK information is transmitted on a PUSCH, and a cell carrying a UL grant is different from a cell carrying a PUCCH, the following operation may be performed.

From the perspective of the UE, method #1-1 may be applied in CASE A and/or method #2-1 may be applied in CASE B. This may be, for example, because the DCI transmission cell and the UL transmission cell are different and thus it is appropriate to adjust a CWS on a cell basis.

For example, when the BS has failed in receiving the PUSCH and/or the PUCCH (or both of the PUSCH and the PUCCH) (in relation to HARQ-ACK information), method #4-1 may be applied on the assumption of DCI missing as in CASE 2-2, whereas when the BS has successfully received the PUSCH and/or the PUCCH, CASE 1 may be applied.

That is, in this example, when considering that the HARQ-ACK reception of the BS is successful, the UE may reset the UL CWS of every priority class corresponding to the cell carrying the PUSCH and/or PUCCH including the HARQ-ACK transmission.

Alternatively in this example, when considering that the HARQ-ACK reception of the BS is failed, the UE may increase the UL CWS to a next value for every priority class corresponding to the cell carrying the PUSCH and/or PUCCH including the HARQ-ACK transmission.

4.3.3.3. [SCENARIO 3-3]

For example, when a cell carrying a PDSCH is identical to a cell carrying a PUSCH and/or PUCCH including HARQ-ACK information, the following operations may be performed.

(Example 1) In the case where the BS has failed in receiving the PUSCH and/or the PUCCH (or both of the PUSCH and the PUCCH) (in relation to HARQ-ACK information) as in CASE 2, when it is considered that the UE has transmitted the HARQ-ACK information as in CASE 2-1 and the HARQ-ACK information is processed as (ALL) NACK as in method #3-1, method #1-2 may be applied in CASE A and/or method #2-2 may be applied in CASE B, from the perspective of the UE. For example, when the BS has successfully received the PUSCH and/or the PUCCH (in relation to HARQ-ACK information), CASE 1 may be applied. And/or (Example 2) In the case where the BS has failed in receiving the PUSCH and/or the PUCCH (in relation to HARQ-ACK information) as in CASE 2, when it is considered that the UE has transmitted the HARQ-ACK information as in CASE 2-1 and the HARQ information is processed as IGNORE as in method #3-2, method #1-1 may be applied in CASE A and/or method #2-1 may be applied in CASE B, from the perspective of the UE. For example, even though the BS has successfully received the PUSCH and/or the PUCCH (in relation to HARQ-ACK information), the HARQ-ACK information may be processed as IGNORE and/or the DL CWS may be maintained.

That is, in example 1, when considering that the HARQ-ACK reception of the BS is successful, the UE may maintain the UL CWS for every priority class corresponding to the cell carrying the PUSCH and/or PUCCH including the HARQ-ACK transmission.

Alternatively in example 1, when it is considered that the HARQ-ACK reception of the BS is failed and the HARQ-ACK is processed as (ALL) NACK, the UE may maintain the UL CWS for every priority class corresponding to the cell carrying the PUSCH and/or PUCCH including the HARQ-ACK transmission. For example, when the HARQ-ACK is processed as (ALL NACK), the BS may increase the DL CWS accordingly. Therefore, the UL CWS may be maintained to prevent both of the DL CWS and the UL CWS from increasing in the situation.

Alternatively in example 2, when considering that the HARQ-ACK reception of the BS is successful, the UE may reset the UL CWS for every priority class corresponding to the cell carrying the PUSCH and/or PUCCH including the HARQ-ACK transmission.

Alternatively in example 2, when it is considered that the BS has failed in the HARQ-ACK reception and the HARQ-ACK is processed as IGNORE, the UE may increase the UL CWS to a next value for every priority class in the cell carrying the PUSCH and/or PUCCH including the HARQ-ACK transmission. For example, when the HARQ-ACK is processed as IGNORE, no action is taken in response to the failure of the HARQ-ACK reception from the perspective of the BS. Therefore, the UE may need to take an action and thus increase the UL CWS in this situation.

4.3.3.4. [SCENARIO 3-4]

For example, when a cell carrying a PDSCH is different from a cell carrying a PUSCH and/or PUCCH including HARQ-ACK information, the following operations may be performed.

From the perspective of the UE, method #1-1 may be applied in CASE A and/or method #2-1 may be applied in CASE B.

That is, in this example, when considering that the HARQ-ACK reception of the BS is successful, the UE may reset the UL CWS for every priority class corresponding to the cell carrying the PUSCH and/or PUCCH including the HARQ-ACK transmission.

Alternatively in this example, when considering that the HARQ-ACK reception of the BS is failed, the UE may increase the UL CWS to a next value for every priority class corresponding to the cell carrying the PUSCH and/or PUCCH including the HARQ-ACK transmission.

4.3.3.5. [SCENARIO 3-5]

For example, when DCI requesting an HARQ-ACK feedback (and/or a PDSCH) is transmitted in a licensed carrier and/or channel, the following operations may be performed.

From the perspective of the UE, method #1-1 may be applied in CASE A and/or method #2-1 may be applied in CASE B.

That is, in this example, when considering that the HARQ-ACK reception of the BS is successful, the UE may reset the UL CWS for every priority class corresponding to the cell carrying the PUSCH and/or PUCCH including the HARQ-ACK transmission.

Alternatively in this example, when considering that the HARQ-ACK reception of the BS is failed, the UE may increase the UL CWS to a next value for every priority class corresponding to the cell carrying the PUSCH and/or PUCCH including the HARQ-ACK transmission.

4.3.3.6. [SCENARIO 3-6]

For example, in the case where the BS has failed in receiving a PUSCH and/or a PUCCH as in CASE 2, when CAP (LBT) failure of the UE is assumed as in CASE 2-3, the following operations may be performed.

From the perspective of the UE, method #1-1 may be applied in CASE A and/or method #2-1 may be applied in CASE B.

That is, in this example, when considering that the HARQ-ACK reception of the BS is successful, the UE may reset the UL CWS for every priority class corresponding to the cell carrying the PUSCH and/or PUCCH including the HARQ-ACK transmission.

Alternatively in this example, when considering that the HARQ-ACK reception of the BS is failed, the UE may increase the UL CWS to a next value for every priority class corresponding to the cell carrying the PUSCH and/or PUCCH including the HARQ-ACK transmission.

According to various embodiments of the present disclosure, the UE and/or the BS may adjust a CWS for a DL/UL signal transmission in an unlicensed band according to a combination of one or more of the above-described scenarios. According to various embodiments of the present disclosure, when the CWS is adjusted accordingly for the DL/UL signal transmission, the UE and/or the BS may attempt/perform the DL/UL signal transmission based on a CAP to which the adjusted CWS is applied.

Figure 23:
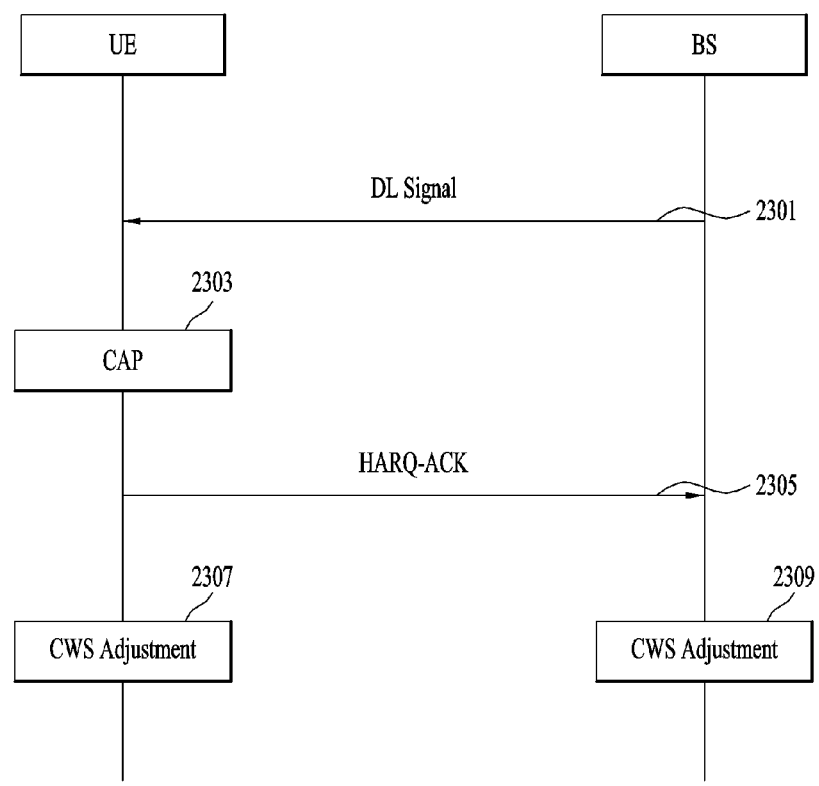
FIG. 23 is a simplified diagram illustrating a signal flow for an exemplary method of operating a user equipment (UE) and a base station (BS) according to various embodiments of the present disclosure.

FIG. 23 is a simplified diagram illustrating a signal flow for an exemplary method of operating a UE and a BS according to various embodiments of the present disclosure.

Figure 24:
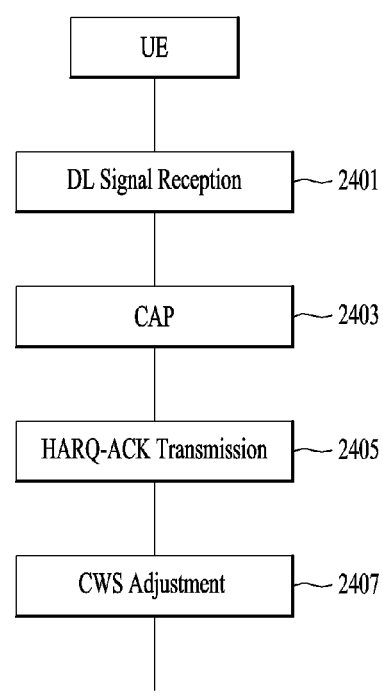
FIG. 24 is a flowchart illustrating a method of operating a UE according to various embodiments of the present disclosure.

FIG. 24 is a flowchart illustrating a method of operating a UE according to various embodiments of the present disclosure.

Figure 25:
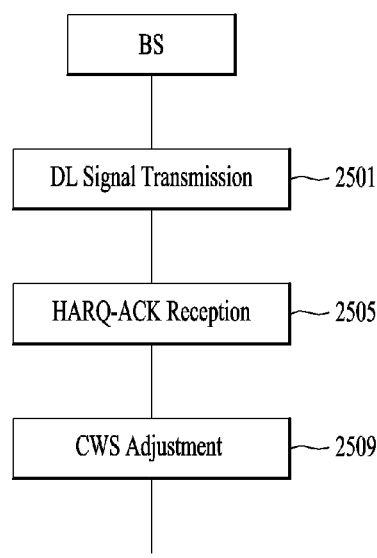
FIG. 25 is a flowchart illustrating a method of operating a BS according to various embodiments of the present disclosure.

FIG. 25 is a flowchart illustrating a method of operating a BS according to various embodiments of the present disclosure.

Referring to FIGS. 23, 24 and 25, the BS may transmit a DL signal in a first cell to the UE and the UE may receive the DL signal in operations 2301, 2401, and 2501 according to an exemplary embodiment.

In operations 2303 and 2403 according to an exemplary embodiment, the UE may perform a CAP.

In operations 2305, 2405, and 2505 according to an exemplary embodiment, the UE may transmit an HARQ-ACK in a second cell included in an unlicensed band to the BS, and the BS may receive the HARQ-ACK.

In operations 2307 and 2407 according to an exemplary embodiment, the UE may adjust a CWS.

In operations 2309 and 2509 according to an exemplary embodiment, the BS may adjust a CWS.

For example, the UE and/or the BS may adjust the CWS based on (i) the DL signal, (ii) whether the first cell and the second cell are identical, and (iii) whether (it is determined that) the BS has successfully received the HARQ-ACK.

For example, the DL signal may be received in a licensed band or an unlicensed band.

A more specific operation of the BS and/or the UE according to the afore-described various embodiments of the present disclosure may be described and performed based on clause 1 to clause 4.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

5. Exemplary Configurations of Devices Implementing Various Embodiments of the Present Disclosure

5.1. Exemplary Configurations of Devices to which Various Embodiments of the Present Disclosure are Applied FIG. 26 is a diagram illustrating devices that implement various embodiments of the present disclosure.

Figure 26:
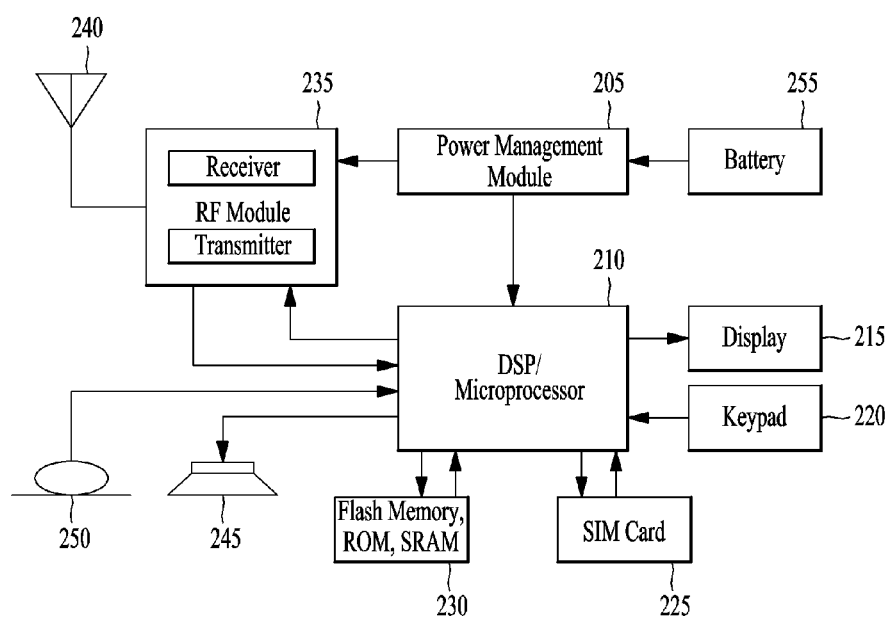
FIG. 26 is a block diagram illustrating an apparatus for implementing various embodiments of the present disclosure.

The devices illustrated in FIG. 26 may be a UE and/or a BS (e.g., eNB or gNB) adapted to perform the afore-described mechanisms, or any devices performing the same operation.

Referring to FIG. 26, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 26 may illustrate a UE including a receiver 235 configured to receive a request message from a network and a transmitter 235 configured to transmit transmission/reception timing information to the network. The transmitter and the receiver may form the transceiver 235. The UE may further include the processor 210 coupled to the transceiver 235.

Further, FIG. 26 may illustrate a network including a transmitter 235 configured to transmit a request message to a UE and a receiver 235 configured to receive transmission and reception timing information from the UE. The transmitter and the receiver may form the transceiver 235. The network further includes the processor 210 coupled to the transmitter and the receiver. The processor 210 may calculate a latency based on the transmission and reception timing information.

According to various embodiments of the present disclosure, the processors included in the UE (or a communication device included in the UE) and the BS (or a communication device included in the BS) may operate as follows by controlling memories.

According to various embodiments of the present disclosure, a UE or a BS may include at least one transceiver, at least one memory, and at least one processor connected to the at least one transceiver and the at least one memory. The at least one memory may store instructions which cause the at least one processor to perform the following operation.

A communication device included in the UE or the BS may be configured to the at least one processor and the at least one processor. The communication device may be configured to include the at least one transceiver or may be connected to the at least one transceiver without including the at least one transceiver.

According to various embodiments of the present disclosure, the at least one processor included in the UE (or the at least one processor of the communication device included in the UE) may receive a DL signal in a first cell from the BS. According to various embodiments of the present disclosure, the at least one processor included in the UE may perform a CAP. According to various embodiments of the present disclosure, the at least one processor included in the UE may transmit an HARQ-ACK to the BS in a second cell included in an unlicensed band based on the CAP. According to various embodiments of the present disclosure, the at least one processor included in the UE may adjust a CWS.

According to an exemplary embodiment, the CWS may be adjusted based on (i) the DL signal, (ii) whether the first cell is identical to the second cell, and (iii) a determination as to whether the BS has successfully received the HARQ-ACK.

According to various embodiments of the present disclosure, the at least one processor included in the BS (or the at least one processor of the communication device included in the BS) may transmit a DL signal in a first cell to the UE. According to various embodiments of the present disclosure, the at least one processor included in the BS may receive an HARQ-ACK from in a second cell included in an unlicensed band. According to various embodiments of the present disclosure, the at least one processor included in the BS may adjust a CWS.

According to an exemplary embodiment, the CWS may be adjusted based on (i) the DL signal, (ii) whether the first cell is identical to the second cell, and (iii) a determination as to whether the BS has successfully received the HARQ-ACK.

For example, the DL signal may be received in a licensed band or an unlicensed band.

More specific operations of the processor included in the BS and/or the UE according to various embodiments of the present disclosure may be described and performed based on the afore-described clause 1 to clause 4.

Unless contradicting with each other, various embodiments of the present disclosure may be implemented in combination. For example, (the processor and so on included in) the BS and/or the UE according to various embodiments of the present disclosure may perform operations in combination of the embodiments of the afore-described clause 1 to clause 4, unless contradicting with each other.

5.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 27:
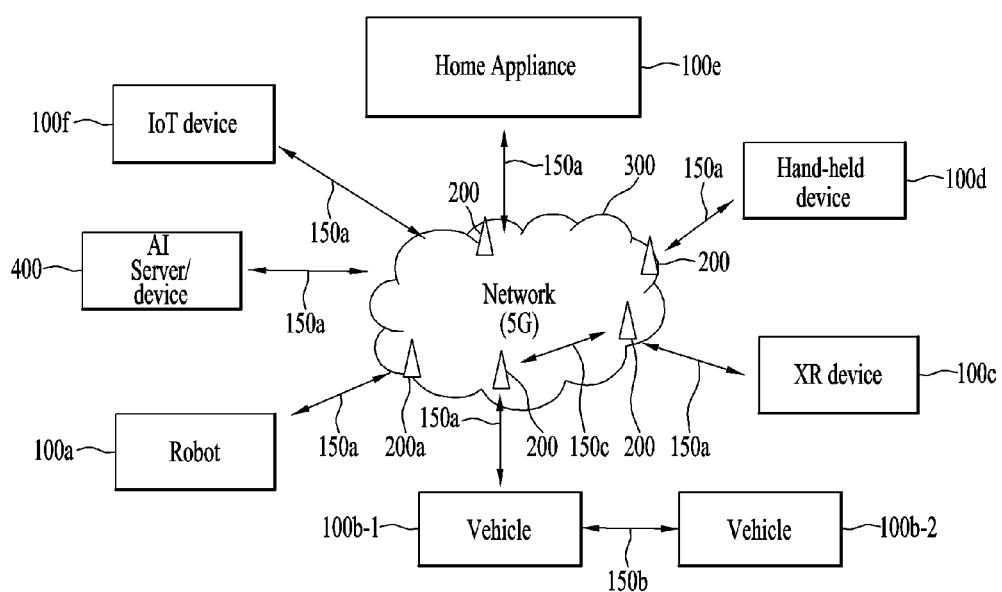
FIG. 27 is a diagram illustrating a communication system to which various embodiments of the present disclosure are applicable.

FIG. 27 illustrates an exemplary communication system to which various embodiments of the present disclosure are applied.

Referring to FIG. 27, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 28:
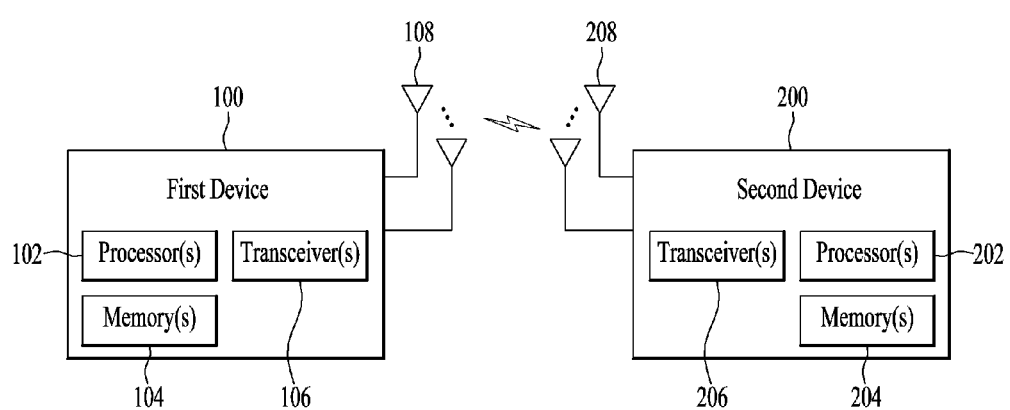
FIG. 28 is a block diagram illustrating wireless devices to which various embodiments of the present disclosure are applicable.

5.2.1 Example of Wireless Devices to which Various Embodiments of the Present Disclosure are Applied FIG. 28 illustrates exemplary wireless devices to which various embodiments of the present disclosure are applicable.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 27.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 29:
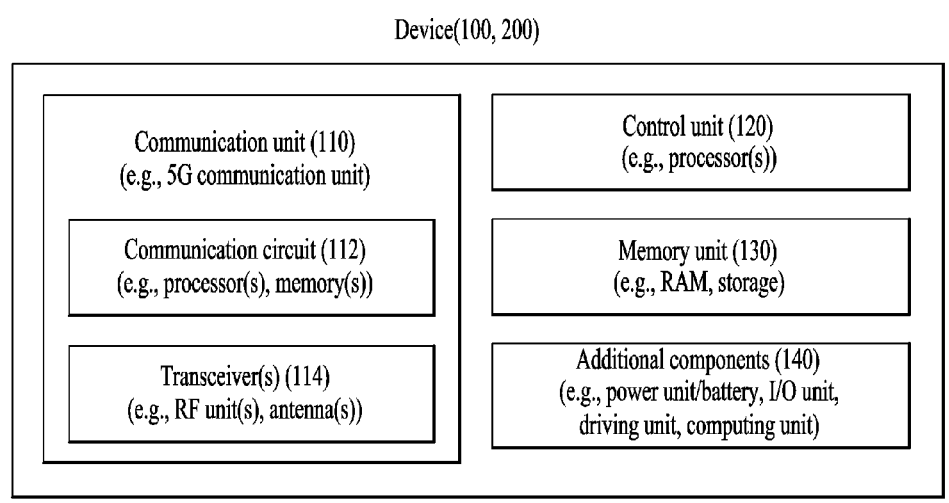
FIG. 29 is a block diagram illustrating another example of wireless devices to which various embodiments of the present disclosure are applicable.

5.2.2. Example of Using Wireless Devices to which Various Embodiments of the Present Disclosure are Applied FIG. 29 illustrates other exemplary wireless devices to which various embodiments of the present disclosure are applied. The wireless devices may be implemented in various forms according to a use case/service (see FIG. 27).

Referring to FIG. 29, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27), a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 29 will be described in detail with reference to the drawings.

Figure 30:
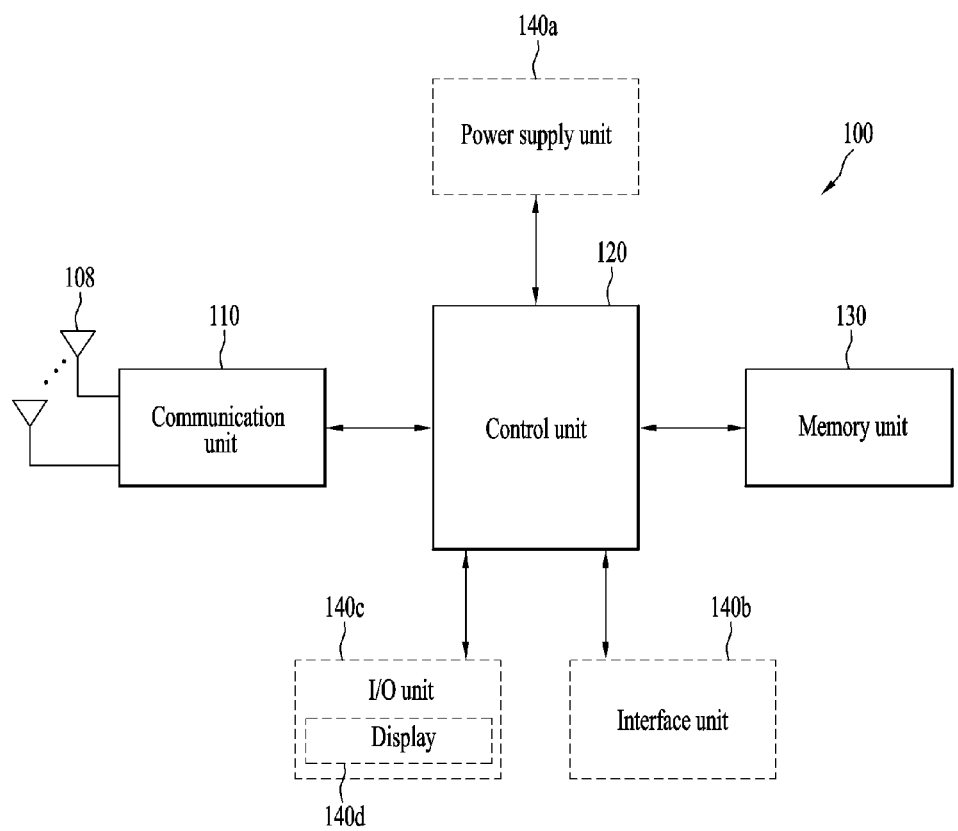
FIG. 30 is a block diagram illustrating a portable device applied to various embodiments of the present disclosure.

5.2.3. Example of Portable Device to which Various Embodiments of the Present Disclosure are Applied FIG. 30 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 30, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 29, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

5.2.4. Example of Vehicle or Autonomous Driving Vehicle to which Various Embodiments of the Present Disclosure.

Figure 31:
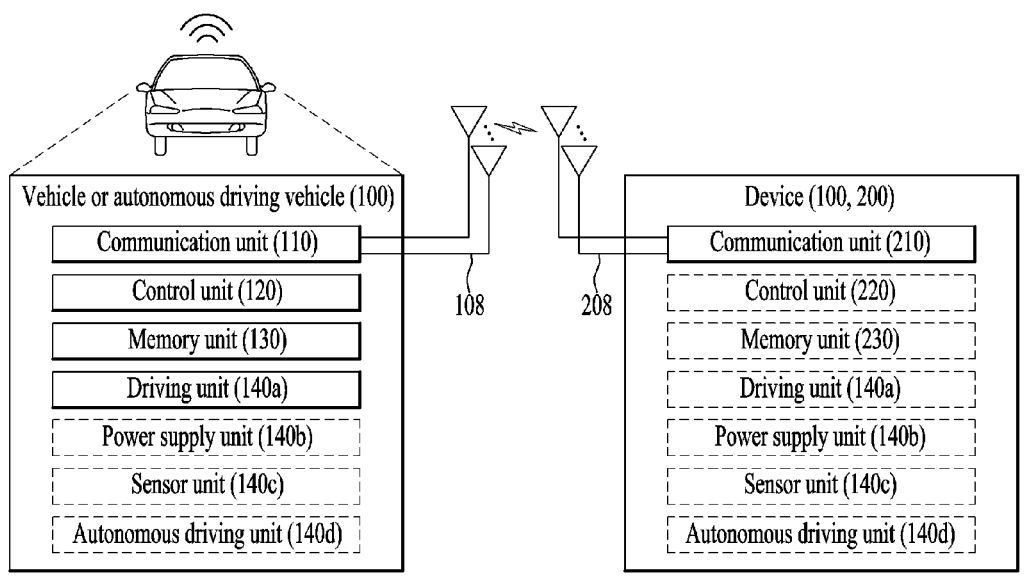
FIG. 31 is a block diagram illustrating a vehicle or an autonomous driving vehicle, which is applied to various embodiments of the present disclosure.

FIG. 31 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 31, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 29, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 32:
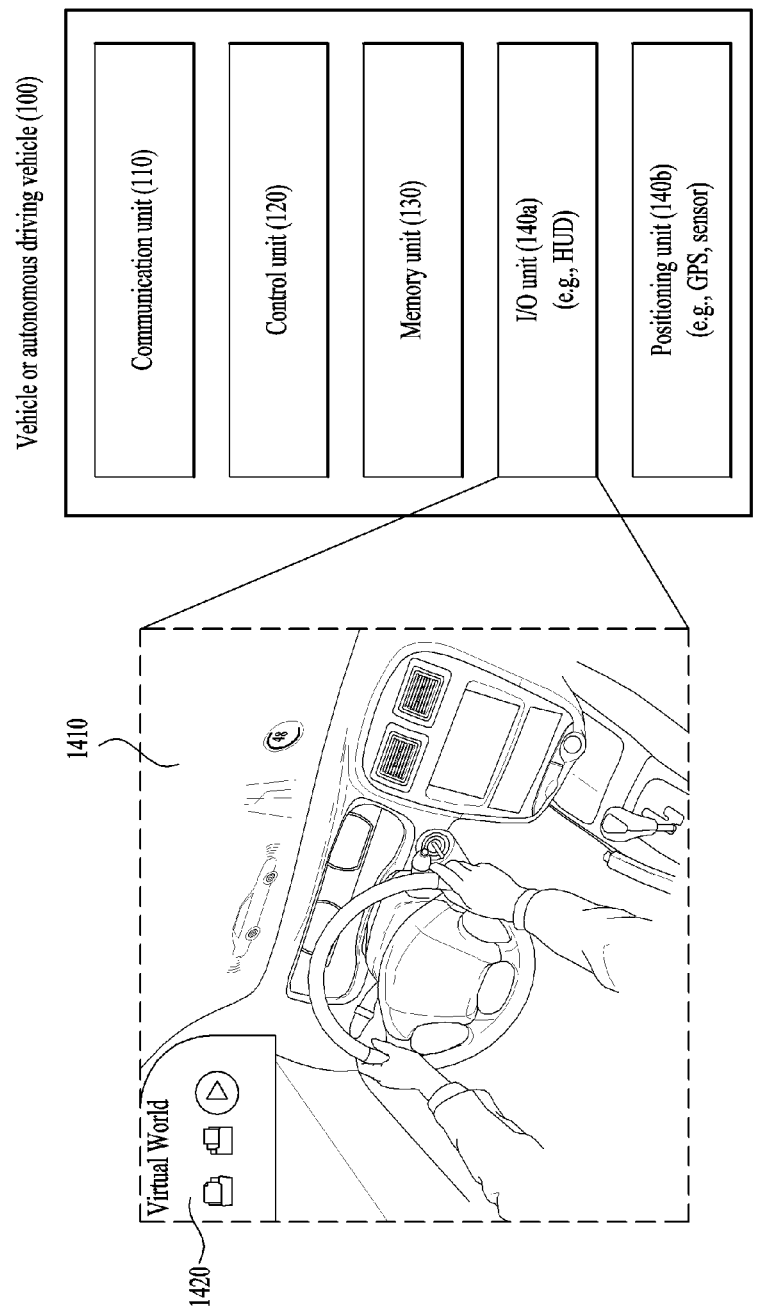
FIG. 32 is a block diagram illustrating a vehicle applied to various embodiments of the present disclosure.

5.2.5. Example of AR/VR and Vehicle to which Various Embodiments of the Present Disclosure FIG. 32 illustrates an exemplary vehicle to which various embodiments of the present disclosure are applied. The vehicle may be implemented as a transportation means, a train, an aircraft, a ship, or the like.

Referring to FIG. 32, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 29.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

What is claimed is:

1. A method of operating a user equipment (UE) in a wireless communication system, the method comprising:
   receiving a downlink signal in a first cell from a base station (BS);
   performing a channel access procedure (CAP);
   transmitting a hybrid automatic repeat and request acknowledgment (HARQ-ACK) to the BS in a second cell configured in an unlicensed band based on the CAP; and
   adjusting a contention window size (CWS),
   wherein the CWS is adjusted based on (i) the downlink signal, (ii) whether the first cell and the second cell are identical, and (iii) a determination as to whether the BS has successfully received the HARQ-ACK.

2. The method of claim 1, wherein based on the downlink signal comprising downlink control information (DCI) and the first cell and the second cell being identical, the CWS is maintained for both of a determination that the BS has successfully received the HARQ-ACK and a determination that the BS has not successfully received the HARQ-ACK.

3. The method of claim 2, wherein the determination that the BS has successfully received the HARQ-ACK and the determination that the BS has not successfully received the HARQ-ACK are related to successful reception of the DCI and failed reception of the DCI, respectively.

4. The method of claim 1, wherein based on the downlink signal comprising DCI, the first cell and the second cell being different, and a determination that the BS has successfully received the HARQ-ACK, the CWS is reset, and
   wherein based on the downlink signal comprising DCI, the first cell and the second cell being different, and a determination that the BS has not successfully received the HARQ-ACK, the CWS is increased.

5. The method of claim 4, wherein the HARQ-ACK is transmitted on a physical uplink control channel (PUCCH) in the second cell or on a physical uplink shared channel (PUSCH) in the second cell,
   wherein the DCI comprises information regarding a downlink assignment in correspondence with the transmission of the HARQ-ACK on the PUCCH, and
   wherein the DCI comprises information regarding an uplink grant scheduling the PUSCH in correspondence with the transmission of the HARQ-ACK on the PUSCH.

6. The method of claim 1, wherein based on the downlink signal comprising a physical downlink shared channel (PDSCH), the first cell and the second cell being identical, and a determination that the BS has not successfully received the HARQ-ACK, the CAP is maintained in response to processing of the HARQ-ACK as negative ACK (NACK), and the CAP is increased in response to processing of the HARQ-ACK as IGNORE.

7. The method of claim 1, wherein based on the downlink signal comprising a PDSCH, the first cell and the second cell being different, and a determination that the BS has successfully received the HARQ-ACK, the CWS is reset, and wherein based on the downlink signal comprising the PDSCH, the first cell and the second cell being different, and a determination that the BS has not successfully received the HARQ-ACK, the CWS is increased.

8. The method of claim 1, wherein the CWS is adjusted for every priority class.

9. The method of claim 1, wherein based on at least one of preset first conditions being satisfied, it is determined that the BS has successfully received the HARQ-ACK, and wherein based on at least one of preset second conditions being satisfied, it is determined that the BS has not successfully received the HARQ-ACK.

10. The method of claim 9, wherein the preset first conditions comprise a condition comprising (i) reception of a first request requesting an HARQ-ACK corresponding to a first index among a plurality of preset indexes from the BS, (ii) transmission of the HARQ-ACK corresponding to the first index to the BS, and (iii) the HARQ-ACK corresponding to the first index not being requested by a second request for an HARQ-ACK, received from the BS within a predetermined time period after the transmission of the HARQ-ACK corresponding to the first index, and wherein the preset second conditions comprise a condition comprising (i) reception of the first request from the BS, (ii) transmission of the HARQ-ACK corresponding to the first index to the BS, and (iii) the HARQ-ACK corresponding to the first index being requested by the second request for an HARQ-ACK, received from the BS within the predetermined time period after the transmission of the HARQ-ACK corresponding to the first index.

11. The method of claim 10, wherein the predetermined time period spans slots between slot #n and slot #n+k, wherein slot #n is a slot in which the HARQ-ACK corresponding to the first index is transmitted, slot #n+k is a slot in which a third request requesting an HARQ-ACK corresponding to a second index different from the first index among the plurality of preset indexes is received, n is an integer equal to or greater than 0, and k is a natural number.

12. The method of claim 9, wherein the preset first conditions comprise a condition including (i) reception of a fourth request requesting an HARQ-ACK corresponding to a first group among a plurality of preset groups from the BS, (ii) transmission of the HARQ-ACK corresponding to the first group to the BS, and (iii) a DCI field corresponding to the first group being toggled in DCI received from the BS after the transmission of the HARQ-ACK corresponding to the first group, and wherein the preset second conditions comprise a condition comprising (i) reception of the fourth request from the BS, (ii) transmission of the HARQ-ACK corresponding to the first group to the BS, and (iii) the DCI field corresponding to the first group not being toggled in the DCI received from the BS after the transmission of the HARQ-ACK corresponding to the first group.

13. An apparatus configured to operate in a wireless communication system, the apparatus comprising:
a memory; and
at least one processor connected to the memory,
wherein the at least one processor is configured to:
receive a downlink signal in a first cell from a base station (BS);
perform a channel access procedure (CAP);
transmit a hybrid automatic repeat and request acknowledgment (HARQ-ACK) to the BS in a second cell configured in an unlicensed band based on the CAP; and
adjust a contention window size (CWS), and
wherein the CWS is adjusted based on (i) the downlink signal, (ii) whether the first cell and the second cell are identical, and (iii) a determination as to whether the BS has successfully received the HARQ-ACK.

14. The apparatus of claim 13, wherein the apparatus is configured to communicate with at least one of a user equipment (UE), a network, or an autonomous driving vehicle other than a vehicle including the apparatus.

15. An apparatus configured to operate in a wireless communication system, the apparatus comprising:
a memory; and
at least one processor connected to the memory,
wherein the at least one processor is configured to:
transmit a downlink signal in a first cell to a user equipment (UE);
receive a hybrid automatic repeat and request acknowledgment (HARQ-ACK) from the UE in a second cell configured in an unlicensed band based on a channel access procedure (CAP); and
adjust a contention window size (CWS) for the CAP, and
wherein the CWS is adjusted based on (i) the downlink signal, (ii) whether the first cell and the second cell are identical, and (iii) a determination as to whether the HARQ-ACK has been successfully received.

* * * * *